US012587293B2

(12) United States Patent
Miura et al.

(10) Patent No.: US 12,587,293 B2
(45) Date of Patent: Mar. 24, 2026

(54) DATA PROCESSING DEVICE, DATA PROCESSING METHOD, AND COMPUTER READABLE MEDIUM

(71) Applicant: Mitsubishi Electric Corporation, Tokyo (JP)

(72) Inventors: Takuya Miura, Tokyo (JP); Hiroaki Hirai, Tokyo (JP); Toshiyuki Kuriyama, Tokyo (JP); Kosuke Shimmyo, Tokyo (JP); Katsuhiro Kondo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 307 days.

(21) Appl. No.: 18/535,101

(22) Filed: Dec. 11, 2023

(65) Prior Publication Data

US 2024/0113793 A1     Apr. 4, 2024

Related U.S. Application Data

(63) Continuation of application No. PCT/JP2021/028584, filed on Aug. 2, 2021.

(51) Int. Cl.
*H04B 17/318* (2015.01)
*B61L 25/02* (2006.01)
(Continued)

(52) U.S. Cl.
CPC .......... *H04B 17/318* (2015.01); *B61L 25/025* (2013.01); *B61L 27/70* (2022.01); *H04B 17/345* (2015.01); *H04W 4/42* (2018.02)

(58) Field of Classification Search
CPC ... H04B 17/318; H04B 17/345; B61L 25/025; B61L 27/70; H04W 4/42
See application file for complete search history.

(56) References Cited

U.S. PATENT DOCUMENTS 6,188,356 B1    2/2001 Kitayoshi
10,182,306 B2 * 1/2019 Kanayama .............. H04W 4/02
(Continued)

FOREIGN PATENT DOCUMENTS

JP          11-326482 A    11/1999
JP        2002-71777 A     3/2002
(Continued)

OTHER PUBLICATIONS

Figure 6: Typical Radiation Pattern of a Directional Antenna with Calibrated Lobes, "Omni Antenna vs. Directional Antenna", Cisco, Retrieved Feb. 25, 2021, 18 pages, https://www.cisco.com/c/ja_jp/support/docs/wireless-mobility/wireless-lan-wian/82068-omni-vs-direct.html.

(Continued)

*Primary Examiner* — Lewis G West
(74) *Attorney, Agent, or Firm* — Birch, Stewart, Kolasch & Birch, LLP

(57) ABSTRACT

A purely-lateral position estimation unit (1603) estimates as an estimated purely-lateral position, when a disturbance wave to disturb communication performed in a train is generated while the train is traveling, a position existing in a purely-lateral direction with respect to a position of a generation source of the disturbance wave. A feature extraction unit (1604) extracts a feature of a measured reception power value being a reception power value measured in the train during a disturbance wave generation period wherein the disturbance wave has been generated. A candidate distance extraction unit (1605) extracts, from learning data indicating a plurality of candidate distances being candidates of a distance between the position of the generation source of the disturbance wave and the estimated purely-lateral position, and indicating for each candidate distance, a feature of an estimated reception power value estimated to be (Continued)

measured in the train when the distance between the position of the generation source of the disturbance wave and the estimated purely-lateral position is the candidate distance, a candidate distance for which the feature of the estimated reception power value matches the feature of the measured reception power value, as an extracted candidate distance. A generation source position estimation unit (1606) estimates a position being distant from the estimated purely-lateral position by the extracted candidate distance, as the position of the generation source of the disturbance wave.

13 Claims, 25 Drawing Sheets

(51) Int. Cl.
B61L 27/70 (2022.01)
H04B 17/345 (2015.01)
H04W 4/42 (2018.01)

(56) References Cited

U.S. PATENT DOCUMENTS

| | | | | |
|---|---|---|---|---|
| 12,166,534 B2 * | 12/2024 | Uchida | .................... | G01S 5/14 |
| 2002/0045975 A1 * | 4/2002 | Carr | .................... | B61L 25/026 |
| | | | | 701/19 |
| 2013/0090801 A1 * | 4/2013 | Backes | .................. | B61L 23/28 |
| | | | | 701/23 |
| 2018/0329052 A1 * | 11/2018 | Gallagher | .............. | H01Q 13/02 |
| 2020/0339171 A1 * | 10/2020 | Nishino | ................ | B61L 25/026 |
| 2021/0114638 A1 * | 4/2021 | Cross | ..................... | B61L 23/06 |
| 2022/0264308 A1 * | 8/2022 | Sakai | .................... | H04W 12/69 |
| 2023/0022877 A1 * | 1/2023 | Schuster | ................ | B61L 23/06 |

FOREIGN PATENT DOCUMENTS

| | | | |
|---|---|---|---|
| JP | 2008-124995 A | | 5/2008 |
| JP | 2012-185047 A | | 9/2012 |
| JP | 2014-238315 A | | 12/2014 |
| JP | 2017-188846 A | | 10/2017 |
| JP | 2017-208679 A | | 11/2017 |
| JP | 2018-91786 A | | 6/2018 |
| JP | 2020-180808 A | | 11/2020 |
| WO | WO 2019/082252 A1 | | 5/2019 |
| WO | WO 2022/145009 A1 | | 7/2022 |

OTHER PUBLICATIONS

International Search Report (PCT/ISA/210) issued in PCT/JP2021/028584, dated Oct. 19, 2021.

Japan Patent Office, "Railroad Control System, FY 2015 Patent Application Technical Trends Survey Report (summary)", Mar. 2016, 120 pages.

Japanese Ministry of Internal Affairs and Communications, "Case of critical radio communication jamming", https://www.soumu.go.jp/soutsu/kanto/re/jyubou/index.html, Retrieved Feb. 25, 2021, 4 pages.

* cited by examiner

Fig. 3

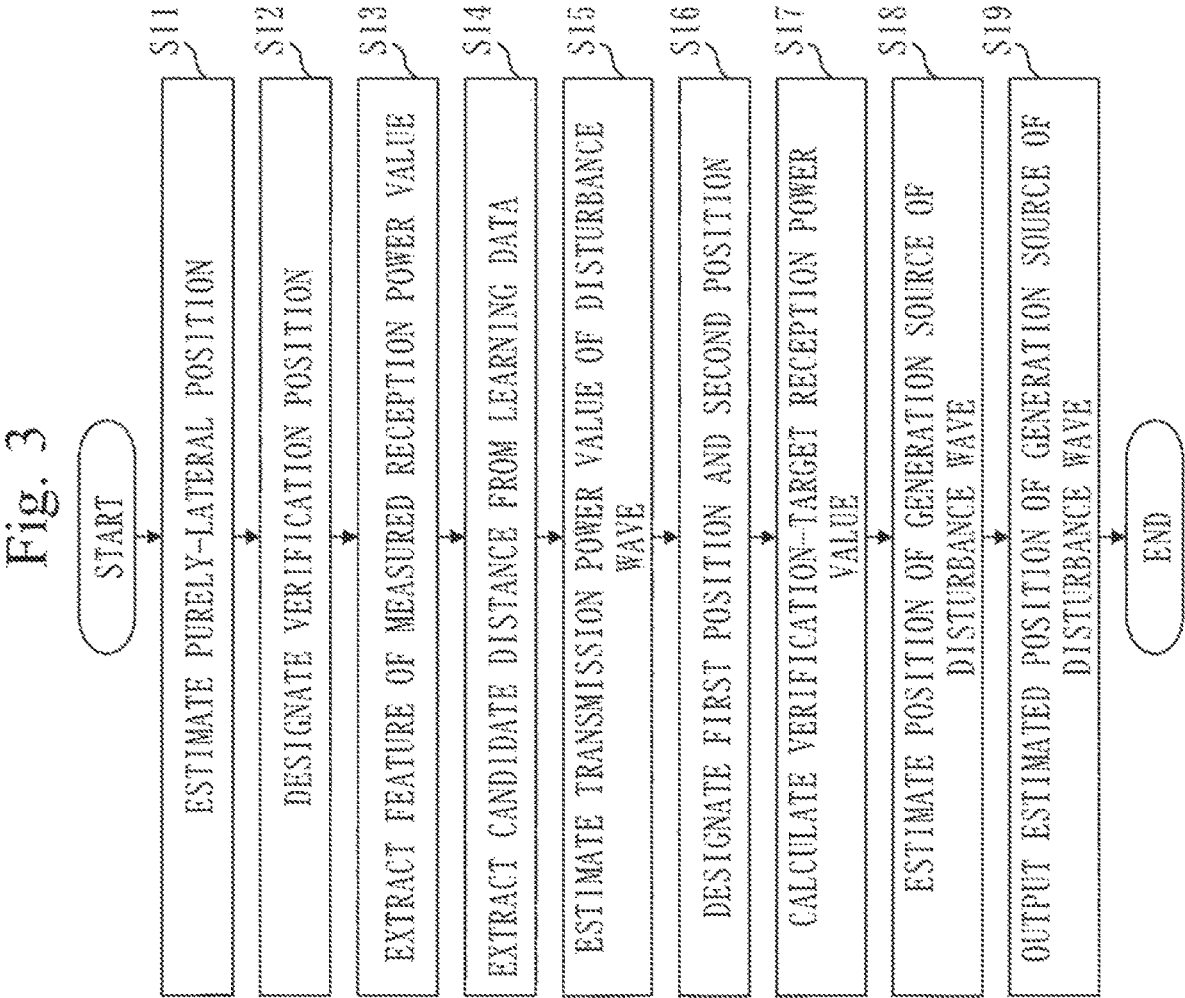

START

S11 ESTIMATE PURELY-LATERAL POSITION

S12 DESIGNATE VERIFICATION POSITION

S13 EXTRACT FEATURE OF MEASURED RECEPTION POWER VALUE

S14 EXTRACT CANDIDATE DISTANCE FROM LEARNING DATA

S15 ESTIMATE TRANSMISSION POWER VALUE OF DISTURBANCE WAVE

S16 DESIGNATE FIRST POSITION AND SECOND POSITION

S17 CALCULATE VERIFICATION-TARGET RECEPTION POWER VALUE

S18 ESTIMATE POSITION OF GENERATION SOURCE OF DISTURBANCE WAVE

S19 OUTPUT ESTIMATED POSITION OF GENERATION SOURCE OF DISTURBANCE WAVE

END (b)

RSSI (dBm)

KILOMETRAGE (km)

CURVE OF CANDIDATE DISTANCE 400m
CURVE OF CANDIDATE DISTANCE 300m
CURVE OF CANDIDATE DISTANCE 200m
CURVE OF CANDIDATE DISTANCE 100m (a)

RSSI (dBm)

KILOMETRAGE (km)

EXTRACT CANDIDATE DISTANCE FOR WHICH FEATURE OF ESTIMATED RECEPTION POWER VALUE MATCHES FEATURE OF MEASURED RECEPTION POWER VALUE

Fig. 6

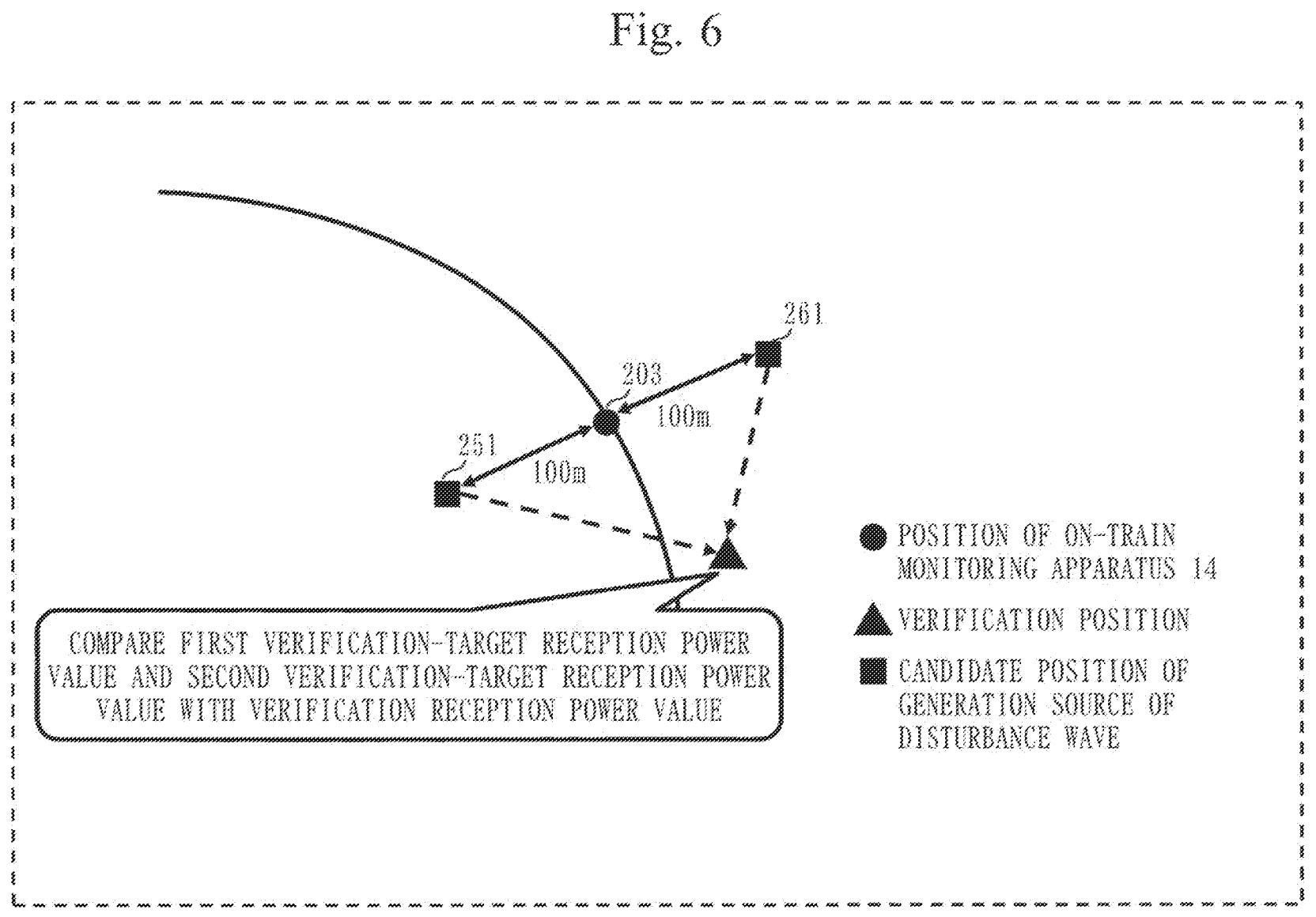

POSITION OF ON-TRAIN
MONITORING APPARATUS 14

VERIFICATION POSITION

CANDIDATE POSITION OF
GENERATION SOURCE OF
DISTURBANCE WAVE

COMPARE FIRST VERIFICATION-TARGET RECEPTION POWER
VALUE AND SECOND VERIFICATION-TARGET RECEPTION POWER
VALUE WITH VERIFICATION RECEPTION POWER VALUE

(a) GROUND MEASUREMENT RESULT DATA

151

| CLOCK TIME | X-COORDINATE | Y-COORDINATE | GROUND WIRELESS APPARATUS NUMBER | ON-TRAIN WIRELESS APPARATUS NUMBER | RSSI |
|---|---|---|---|---|---|
| 1 | 1 | 0 | 0 | 0 | -65 |
| 1 | 1 | 0 | 0 | 1 | -67 |
| 2 | 1 | 0 | 0 | 0 | -70 |
| ... | ... | ... | ... | ... | ... |

(b) ON-TRAIN MEASUREMENT RESULT DATA

152

| CLOCK TIME | X-COORDINATE | Y-COORDINATE | GROUND WIRELESS APPARATUS NUMBER | ON-TRAIN WIRELESS APPARATUS NUMBER | KILOMETRAGE | RSSI |
|---|---|---|---|---|---|---|
| 1 | 1 | 0 | 0 | 0 | 0.1 | -65 |
| 1 | 1 | 0 | 0 | 1 | 0.1 | -67 |
| 2 | 0.95 | 0.08 | 0 | 0 | 0.2 | -70 |
| ... | ... | ... | ... | ... | ... | ... |

| COEFFICIENT VALUE | CANDIDATE DISTANCE | APPROXIMATING RESULT |
|---|---|---|
| 1.5 | 25m | -2000 |
| | 50m | -1000 |
| | ... | ... |
| 2 | 25m | -4000 |
| ... | ... | ... |

START

S101 ANALYZE GROUND MEASUREMENT RESULT DATA

S102 IS DISTURBANCE WAVE GENERATED?

NO

YES

S103 SPECIFY DISTURBANCE WAVE GENERATION PERIOD

S104 EXTRACT RECORD OF ON-TRAIN MEASUREMENT RESULT DATA

S105 ESTIMATE PURELY-LATERAL POSITION AND PURELY-LATERAL ON-TRAIN WIRELESS APPARATUS

S106 DESIGNATE VERIFICATION POSITION

S107 EXTRACT RECURSIVE PROCESSING RECORD

END

Fig.13

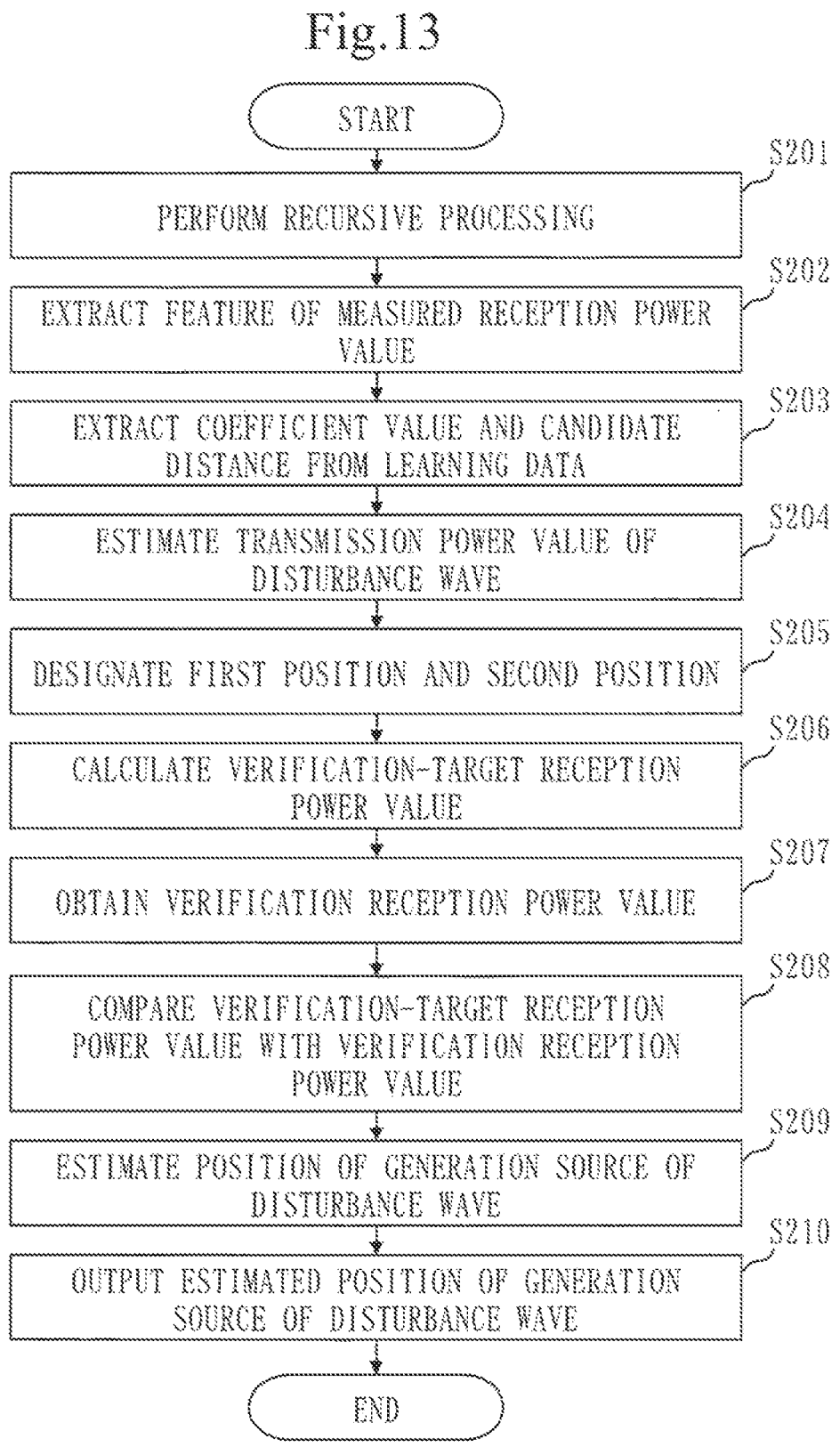

START

S201 — PERFORM RECURSIVE PROCESSING

S202 — EXTRACT FEATURE OF MEASURED RECEPTION POWER VALUE

S203 — EXTRACT COEFFICIENT VALUE AND CANDIDATE DISTANCE FROM LEARNING DATA

S204 — ESTIMATE TRANSMISSION POWER VALUE OF DISTURBANCE WAVE

S205 — DESIGNATE FIRST POSITION AND SECOND POSITION

S206 — CALCULATE VERIFICATION-TARGET RECEPTION POWER VALUE

S207 — OBTAIN VERIFICATION RECEPTION POWER VALUE

S208 — COMPARE VERIFICATION-TARGET RECEPTION POWER VALUE WITH VERIFICATION RECEPTION POWER VALUE

S209 — ESTIMATE POSITION OF GENERATION SOURCE OF DISTURBANCE WAVE

S210 — OUTPUT ESTIMATED POSITION OF GENERATION SOURCE OF DISTURBANCE WAVE

END

| CLOCK TIME | X-COORDINATE | Y-COORDINATE | GROUND WIRELESS APPARATUS NUMBER | ON-TRAIN WIRELESS APPARATUS NUMBER | KILOMETRAGE | RSSI (RIGHT) | RSSI (LEFT) |
|---|---|---|---|---|---|---|---|
| 1 | 1 | 0 | 0 | 0 | 0.1 | -65 | -70 |
| 1 | 1 | 0 | 0 | 1 | 0.1 | -67 | -71 |
| 2 | 0.95 | 0.08 | 0 | 0 | 0.2 | -70 | -71 |
| ⋮ | ⋮ | ⋮ | ⋮ | ⋮ | | ⋮ | ⋮ |

Figure 21:
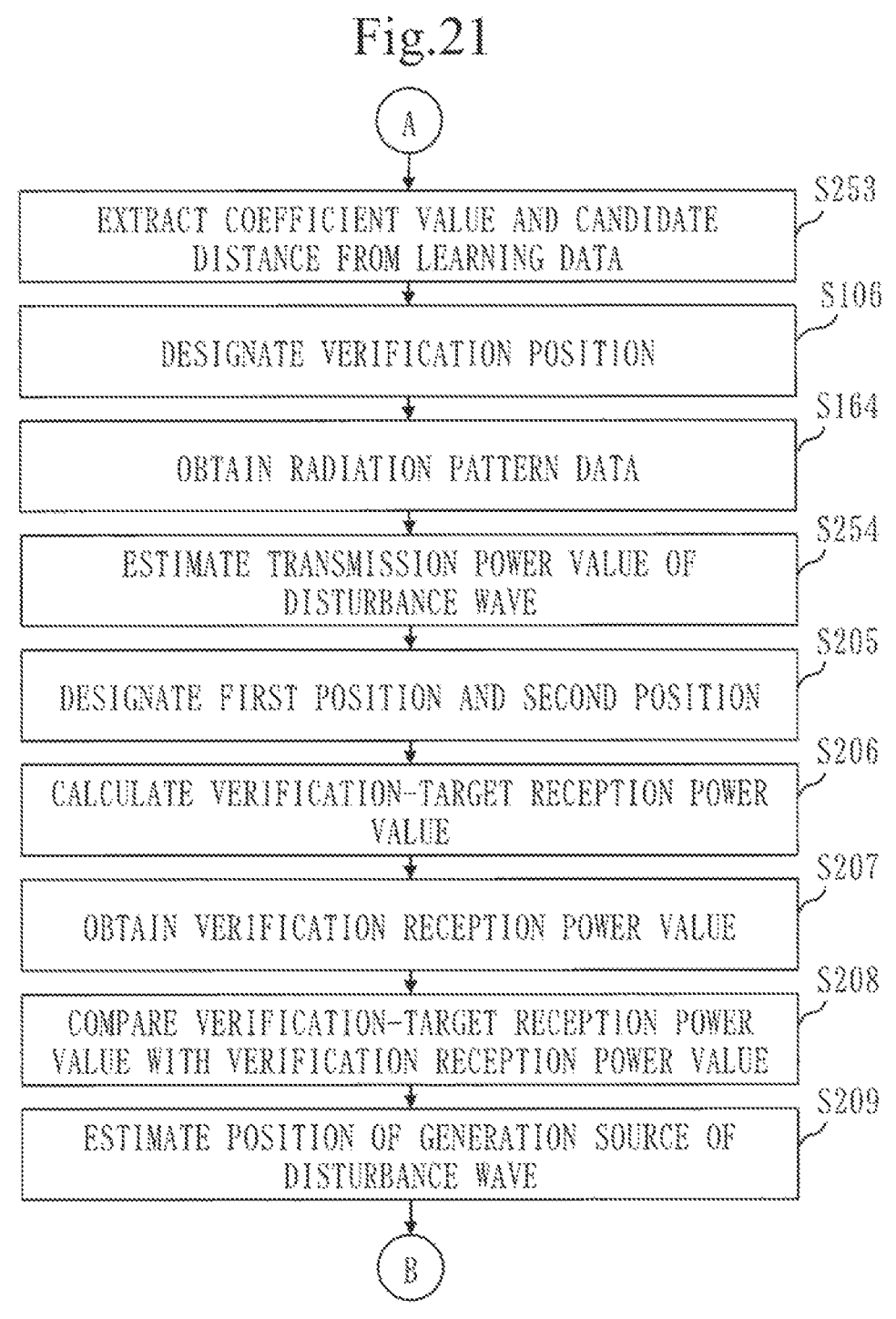

EXTRACT COEFFICIENT VALUE AND CANDIDATE DISTANCE FROM LEARNING DATA    S253

↓

DESIGNATE VERIFICATION POSITION    S106

↓

OBTAIN RADIATION PATTERN DATA    S164

↓

ESTIMATE TRANSMISSION POWER VALUE OF DISTURBANCE WAVE    S254

↓

DESIGNATE FIRST POSITION AND SECOND POSITION    S205

↓

CALCULATE VERIFICATION-TARGET RECEPTION POWER VALUE    S206

↓

OBTAIN VERIFICATION RECEPTION POWER VALUE    S207

↓

COMPARE VERIFICATION-TARGET RECEPTION POWER VALUE WITH VERIFICATION RECEPTION POWER VALUE    S208

↓

ESTIMATE POSITION OF GENERATION SOURCE OF DISTURBANCE WAVE    S209

| ANGLE (deg) | GAIN (dBm) |
|---|---|
| -180 | 0 |
| -179 | 0.01 |
| ... | ... |

DATA PROCESSING DEVICE, DATA PROCESSING METHOD, AND COMPUTER READABLE MEDIUM

CROSS REFERENCE TO RELATED APPLICATIONS

This application is a Continuation of PCT International Application No. PCT/JP2021/028584 filed on Aug. 2, 2021, which is hereby expressly incorporated by reference into the present application.

TECHNICAL FIELD

The present disclosure relates to wireless communication performed in a train control system.

BACKGROUND ART

A train control system using wireless communication has begun to be put into practical use in the world in various manners aiming at streamlining, improvement of safety and reliability, and high functionality, of ground equipment.

The train control system using wireless communication has been put into practical use at home and abroad as well, as follows (Non-Patent Literature 1).

ETCS (European Train Control System)

PTC (Positive Train Control system)

CBTC (Communication Based Train Control system)

ATACS (Advanced Train Administration and Communications System)

As described in Non-Patent Literature 1, the train control system using wireless communication includes a ground wireless communication apparatus along a train line and on-train wireless communication apparatuses on trains. Then, by communicating control information between the ground wireless communication apparatus and the on-train wireless communication apparatus on each train, it is possible to automatically control speed for safety operation.

Since communication of control information between the ground wireless communication apparatus and the on-train wireless communication apparatus is performed wirelessly, it is possible to improve the performance which makes the distance between trains be variable in accordance with the speed of the trains, unlike the conventional track circuit system. Further, since control information communication is performed wirelessly, it is possible to lay tracks flexibly. Furthermore, since control information communication is performed wirelessly, wiring saving is promoted. Additionally, due to wiring saving, wire communication facilities are decreased in number, and as a result, operation burdens and maintenance burdens of the wire communication facilities are reduced.

The train control system using wireless communication has advantages as described above. Meanwhile, the train control system using wireless communication is under an influence of a disturbance wave on a radio frequency used in the train control system. In addition, due to a disturbance wave, there is a risk that the on-train wireless communication apparatus cannot be controlled in the worst case. Further, as described in Non-Patent Literature 2, there is a possibility that the disturbance wave may violate the Radio Law.

Thus, when generation of a disturbance wave is detected, it is necessary to estimate the position of a generation source of the disturbance wave early, and to perform an approach corresponding to the estimated position of the generation source of the disturbance wave.

CITATION LIST

Non-Patent Literature

Non-Patent Literature 1: Railroad Control System, F Y 2015 Patent Application Technical Trends Survey Report (summary)

Non-Patent Literature 2: Japanese Ministry of Internal Affairs and Communications, Case of critical radio communication jamming (https://www.soumu.go.jp/soutsu/kanto/re/jyubou/index.html)

SUMMARY OF INVENTION

Technical Problem

The present disclosure is aimed mainly at estimating a position of a generation source of a disturbance wave in consideration of what described above.

Solution to Problem

There is provided according to one aspect of the present invention a data processing device includes:

a purely-lateral position estimation unit to estimate as an estimated purely-lateral position, when generation of a disturbance wave to disturb communication performed in a train is detected while the train is traveling, a position on a traveling track of the train, existing in a purely-lateral direction of a position of a generation source of the disturbance wave;

a feature extraction unit to extract a feature of a measured reception power value which is a reception power value measured in the train during a disturbance wave generation period being a period wherein the disturbance wave has been generated;

a candidate distance extraction unit to extract, from learning data indicating a plurality of candidate distances being candidates of a distance between the position of the generation source of the disturbance wave and the estimated purely-lateral position, and indicating for each candidate distance, a feature of an estimated reception power value being a reception power value estimated to be measured in the train when the distance between the position of the generation source of the disturbance wave and the estimated purely-lateral position is the candidate distance, a candidate distance for which the feature of the estimated reception power value matches the feature of the measured reception power value, as an extracted candidate distance; and a generation source position estimation unit to estimate a position being distant from the estimated purely-lateral position by the extracted candidate distance, as the position of the generation source of the disturbance wave.

Advantageous Effects of Invention

According to the present disclosure, it is possible to estimate a position of a generation source of a disturbance wave.

BRIEF DESCRIPTION OF DRAWINGS

FIG. 3 is a flowchart illustrating the outline of the operation according to the first embodiment;

FIG. 6 is a diagram illustrating an example of an estimation method of a position of a generation source of a disturbance wave according to the first embodiment;

FIG. 9 is a diagram illustrating an example of ground measurement result data and on-train measurement result data according to the first embodiment;

FIG. 10 is a diagram illustrating an example of learning data according to the first embodiment;

FIG. 13 is a flowchart illustrating an operation example of the disturbance wave generation source estimation device according to the first embodiment;

FIG. 16 is a diagram illustrating an example of a radiation pattern of an directional antenna according to the second embodiment;

FIG. 19 is a diagram illustrating an example of on-train measurement result data according to the second embodiment;

FIG. 21 is a flowchart illustrating an operation example of the disturbance wave generation source estimation device according to the second embodiment;

FIG. 22 is a diagram illustrating an example of radiation pattern data according to the second embodiment;

DESCRIPTION OF EMBODIMENTS

First Embodiment

*Description of System Configuration*

Figure 1:
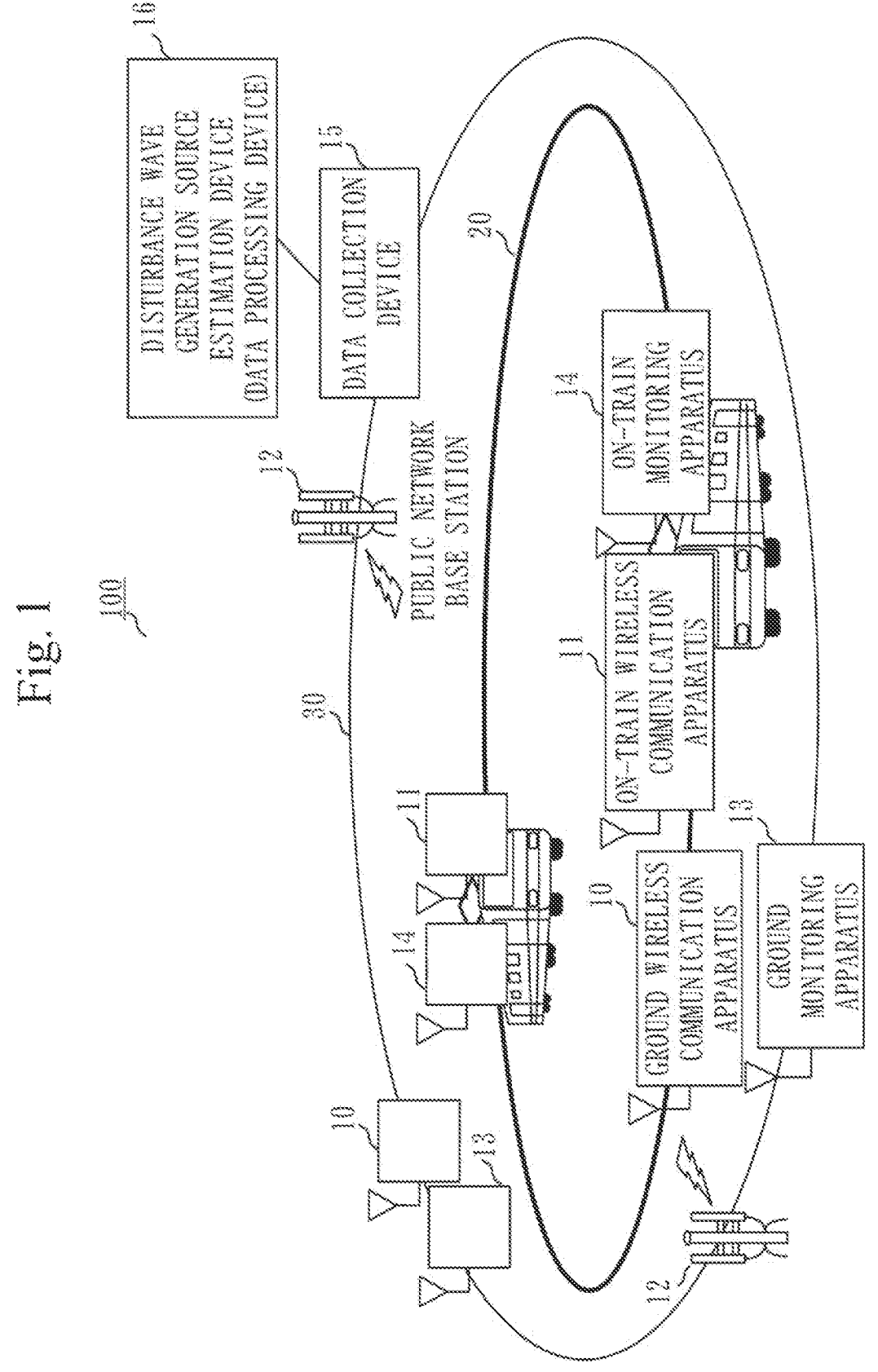
FIG. 1 is a diagram illustrating a configuration example of a train control system according to a first embodiment.

FIG. 1 illustrates a configuration example of a train control system 100 according to the present embodiment.

The train control system 100 controls a train traveling on a traveling track 20.

The train control system 100 according to the present embodiment includes a ground wireless communication apparatus 10, an on-train wireless communication apparatus 11, a public network base station 12, a ground monitoring apparatus 13, an on-train monitoring apparatus 14, a data collection device 15 and a disturbance wave generation source estimation device 16.

In the present embodiment, there shall be a plurality of ground wireless communication apparatuses 10, on-train wireless communication apparatuses 11, public network base stations 12, ground monitoring apparatuses 13 and on-train monitoring apparatuses 14.

The ground wireless communication apparatus 10 is a wireless communication apparatus disposed on the ground. The ground wireless communication apparatus 10 performs wireless communication with the on-train wireless communication apparatus 11 while the train is traveling. That is, the ground wireless communication apparatus 10 transmits and receives radio waves to and from the on-train wireless communication apparatus 11.

The ground wireless communication apparatus 10 can be disposed at any positions as long as it can transmit and receive radio waves to and from the on-train wireless communication apparatus 11; however, the ground wireless communication apparatus 10 is disposed in the vicinity of the route of the train, for example.

The ground wireless communication apparatus 10 is also written as a ground wireless apparatus.

The on-train wireless communication apparatus 11 is a wireless communication apparatus mounted on a train. As described above, the on-train wireless communication apparatus 11 transmits and receives radio waves to and from the ground wireless communication apparatus 10 while the train is traveling.

In the present embodiment, a non-directional antenna is provided in the train, and the on-train wireless communication apparatus 11 communicates with the ground wireless communication apparatus 10 using the non-directional antenna.

The on-train wireless communication apparatus 11 is also written as an on-train wireless apparatus.

The ground monitoring apparatus 13 is disposed on the ground. The ground monitoring apparatus 13 is disposed in the vicinity of the ground wireless communication apparatus 10. For example, the ground monitoring apparatuses 13 is installed in the ground wireless communication apparatus 10. The ground monitoring apparatus 13 measures a reception power value in the ground wireless communication apparatus 10. Specifically, the ground monitoring apparatus 13 measures an RSSI (Received Signal Strength Indicator) as the reception power value.

The ground monitoring apparatus 13 periodically transmits ground measurement result data indicating the RSSI measured to the data collection device 15 via the public network base station 12.

Since the ground monitoring apparatus 13 is disposed in the vicinity of the ground wireless communication apparatus 10, the reception power value measured by the ground monitoring apparatus 13 represents a reception status of radio waves at the ground wireless communication apparatus 10. Further, since the ground monitoring apparatus 13 is disposed in the vicinity of the ground wireless communication apparatus 10, the position of the ground monitoring apparatus 13 can be identified with the position of the ground wireless communication apparatus 10. That is, in the following, "position of the ground monitoring apparatus 13" and "position of the ground wireless communication apparatus 10" can be replaced with each other.

The on-train monitoring apparatus 14 is mounted in the vicinity of the on-train wireless communication apparatus 11. For example, the on-train monitoring apparatus 14 is installed in the on-train wireless communication apparatus 11. The on-train monitoring apparatus 14 measure a reception power value at the on-train wireless communication apparatus 11. Specifically, the on-train monitoring apparatus 14 measures an RSSI as the reception power value.

The on-train monitoring apparatus 14 periodically transmits on-train measurement result data indicating the RSSI measured to the data collection device 15 via the public network base stations 12.

Since the on-train monitoring apparatus 14 is disposed in the vicinity of the on-train wireless communication apparatus 11, the reception power value measured by the on-train monitoring apparatuses 14 represents a reception state of radio wave at the on-train wireless communication apparatus 11. Further, since the on-train monitoring apparatus 14 is disposed in the vicinity of the on-train wireless communication apparatus 11, the position of the on-train monitoring apparatus 14 can be identified with the position of the on-train wireless communication apparatus 11. That is, in the following, "position of the on-train monitoring apparatus 14" and "position of the on-train wireless communication apparatus 11" can be replaced with each other.

The public network base station 12 receives ground measurement result data from the ground monitoring apparatus 13. Further, the public network base station 12 receives on-train measurement result data from the on-train monitoring apparatus 14. Then, the public network base station 12 transmits the ground measurement result data and the on-train measurement result data to the data collection device 15 via a public network 30.

The data collection device 15 periodically collects ground measurement result data from the public network base station 12 via the public network 30. Further, the data collection device 15 periodically collects on-train measurement result data from the public network base station 12 via the public network 30.

The disturbance wave generation source estimation device 16 analyzes the ground measurement result data and the on-train measurement result data collected by the data collection device 15, and detects generation of a disturbance wave. The disturbance wave is a radio wave to disturb communication between the ground wireless communication apparatus 10 and the on-train wireless communication apparatus 11.

Further, the disturbance wave generation source estimation device 16 analyzes the ground measurement result data and the on-train measurement result data, and estimates a position of a generation source of the disturbance wave.

The disturbance wave generation source estimation device 16 corresponds to a data processing device. Further, an operation procedure of the disturbance wave generation source estimation device 16 corresponds to a data processing method. Furthermore, a program to realize the operation of the disturbance wave generation source estimation device 16 corresponds to a data processing program.

In FIG. 1, the ground wireless communication apparatus 10 and the ground monitoring apparatus 13 are realized by different apparatuses; however, the ground wireless communication apparatus 10 and the ground monitoring apparatus 13 may be realized by the same apparatus. Similarly, in FIG. 1, the on-train wireless communication apparatus 11 and the on-train monitoring apparatus 14 are realized by different apparatuses; however, the on-train wireless communication apparatus 11 and the on-train monitoring apparatus 14 may be realized by the same apparatus.

Similarly, the data collection device 15 and the disturbance wave generation source estimation device 16 may be realized by the same apparatus.

*Outline of Embodiment*

In the present embodiment, as descried above, the disturbance wave generation source estimation device 16 estimates the position of the generation source of the disturbance wave. Before describing the configuration and the operation of the disturbance wave generation source estimation device 16 in detail, an outline of the operation to estimate the position of the generation source of the disturbance wave by the disturbance wave generation source estimation device 16 will be described, to facilitate understanding.

Figure 2:
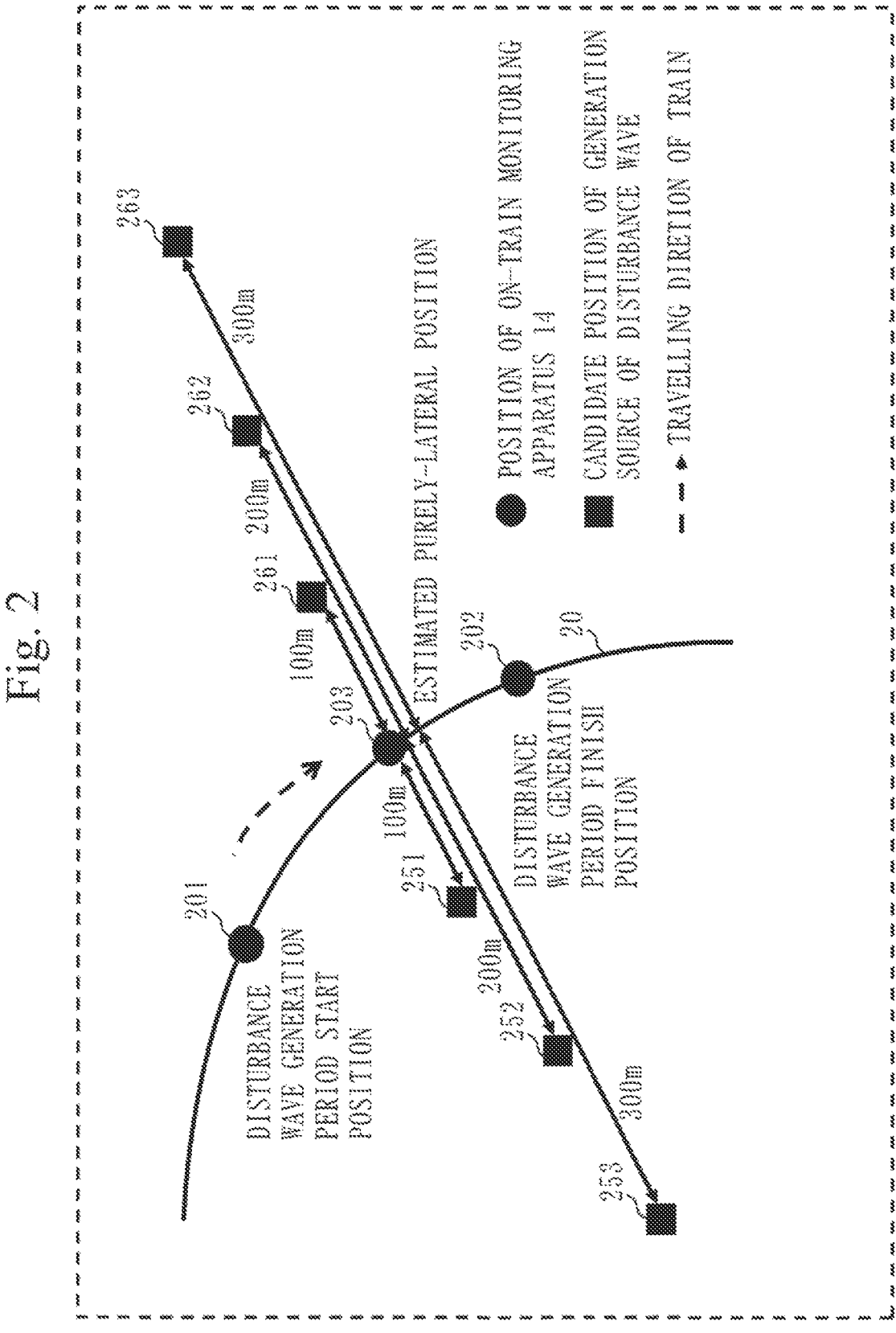
FIG. 2 is a diagram illustrating an outline of an operation according to the first embodiment.

FIG. 2 illustrates positions of the traveling track 20 of the train and the on-train monitoring apparatus 14. In FIG. 2, black dots illustrate positions of the on-train monitoring apparatus 14. Further, black squares illustrate candidate positions of the generation source of the disturbance wave.

Furthermore, in FIG. 2, the train shall travel in the direction of the dashed arrow.

The disturbance wave generation source estimation device 16 detects generation of a disturbance wave and a period of time during which the disturbance wave has been generated, in a manner described below. The time period during which the disturbance wave has been generated is called a disturbance wave generation period. In FIG. 2, a disturbance wave generation period start position 201 is a position of the on-train monitoring apparatus 14 at a start time of the disturbance wave generation period. A disturbance wave generation period finish position 202 is a position of the on-train monitoring apparatus 14 at a finish time of the disturbance wave generation period.

An estimated purely-lateral position 203 is a position on the traveling track 20 in a purely-lateral direction of the position of the generation source of the disturbance wave. That is, it is estimated that the generation source of the disturbance wave exists at the estimated purely-lateral position 203 in any direction (right direction or left direction) vertical to the traveling direction of the train.

The candidate position 251, the candidate position 252 and the candidate position 253 are candidate positions of the generation source of the disturbance wave in the right direction with respect to the traveling direction of the train from the estimated purely-lateral position 203.

The candidate position 251 is a position 100 meters away from the estimated purely-lateral position 203.

The candidate position 252 is a position 200 meters away from the estimated purely-lateral position 203.

The candidate position 253 is a position 300 meters away from the estimated purely-lateral position 203.

A candidate position 261, a candidate position 262 and a candidate position 263 are candidate positions of the generation source of the disturbance wave in the left direction with respect to the traveling direction of the train from the estimated purely-lateral position 203.

The candidate position 261 is a position 100 meters away from the estimated purely-lateral position 203.

The candidate position 262 is a position 200 meters away from the estimated purely-lateral position 203.

The candidate position 263 is a position 300 meters away from the estimated purely-lateral position 203.

The disturbance wave generation source estimation device 16 analyzes the on-train measurement result data and the ground measurement result data, and estimates a candidate position at a highest accuracy as the position of the generation source of the disturbance wave, from among the candidate position 251, the candidate position 252, the candidate position 253, the candidate position 261, the candidate position 262, and the candidate position 263.

FIG. 3 illustrates an outline of an operation of the disturbance wave generation source estimation device 16 according to the present embodiment.

First, in Step S11, the disturbance wave generation source estimation device 16 estimates a purely-lateral position.

Specifically, when the disturbance wave generation source estimation device 16 detects generation of a disturbance wave and a disturbance wave generation period, the disturbance wave generation source estimation device 16 analyzes a reception power value (called a measured reception power value) measured by the on-train monitoring apparatus 14 during the disturbance wave generation period, using the on-train measurement result data.

The reception power value measured by the on-train monitoring apparatus 14 is described in the on-train measurement result data, and the disturbance wave generation source estimation device 16 extracts the reception power value measured by the on-train monitoring apparatus 14 during the disturbance wave generation period, as the measured reception power value.

Then, the disturbance wave generation source estimation device 16 analyzes the measured reception power value, estimates the purely-lateral position, and obtains the estimated purely-lateral position 203. Specifically, the disturbance wave generation source estimation device 16 obtains as the estimated purely-lateral position 203 the traveling position of the on-train monitoring apparatus 14 at the point of time when the largest reception power value among a plurality of reception power values measured as the measured reception power values by the on-train monitoring apparatus 14 is measured. When a plurality of reception power values are measured as the measured reception power values by the plurality of on-train monitoring apparatuses 14 mounted on a plurality of trains during the disturbance wave generation period, the disturbance wave generation source estimation device 16 selects a train where the largest reception power value is measured, and estimates the estimated purely-lateral position 203 on the traveling track 20 of the train selected.

Generally, as a distance between a measuring apparatus (on-train monitoring apparatus 14) and a generation source of a radio wave increases, a power attenuation volume increases. Therefore, the traveling position of the on-train monitoring apparatus 14 at the point of time when the largest reception power value is measured can be estimated as a position closest to the generation source of the disturbance wave, that is, a position (i.e., purely-lateral position) on a straight line vertical to the traveling direction of the train.

Next, in Step S12, the disturbance wave generation source estimation device 16 designates a position on the outside of the traveling track 20 of the train where the reception power value is measured during the disturbance wave generation period, as a verification position.

Specifically, the disturbance wave generation source estimation device 16 designates an installation position of the ground monitoring apparatus 13 closest to the estimated purely-lateral position 203 among the plurality of ground monitoring apparatuses 13, as a verification position.

Next, in Step S13, the disturbance wave generation source estimation device 16 extracts a feature of the measured reception power value, using the on-train measurement result data.

Description will be made on an operation of Step S13, using FIG. 4.

Figure 4:
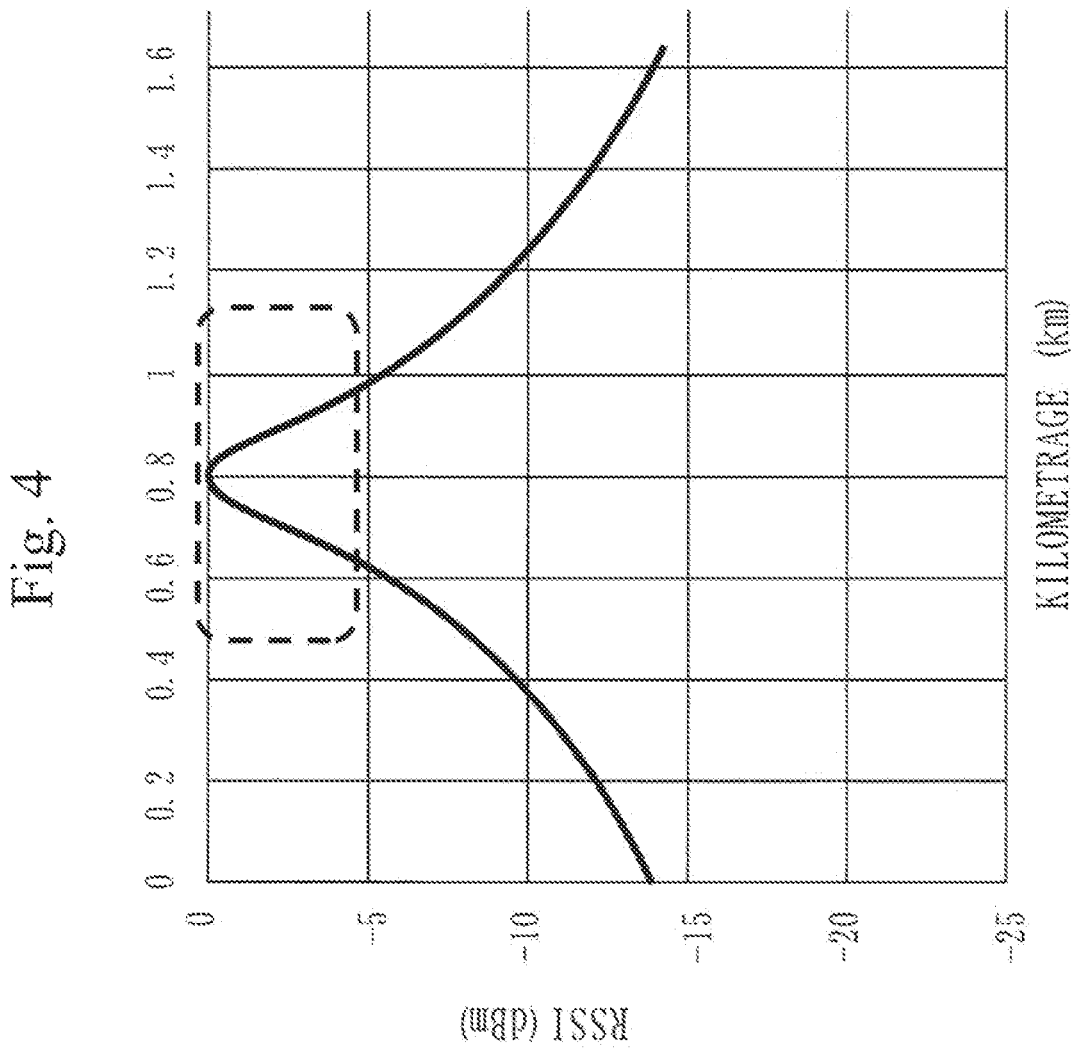
FIG. 4 is a diagram illustrating a feature of a measured reception power value according to the first embodiment.

The curve illustrated in FIG. 4 represents a relation between a measured reception power value (RSSI) being a reception power value during the disturbance wave generation period, and a position (kilometrage) of the on-train monitoring apparatus 14 at the point of time when the measured reception power value is measured.

The disturbance wave generation source estimation device 16 extracts a feature of an area (area surrounded by the dotted line in FIG. 4) near a vertex of the curve illustrated in FIG. 4, for example, as a feature of the measured reception power value.

The disturbance wave generation source estimation device 16 calculates a quadratic function approximating the curved shape of the area, as the feature of the area near the vertex of the curve illustrated in FIG. 4. The feature of the measured reception power value needs not be a quadratic function.

Next, in Step S14, the disturbance wave generation source estimation device 16 extracts a candidate distance from learning data.

The learning data is data obtained by machine learning.

The learning data presents a plurality of candidate distances being candidates of the distance between the position of the generation source of the disturbance wave and the estimated purely-lateral position 203. Each of the distance 100 meters between the estimated purely-lateral position 203 and the candidate position 251 or the candidate position 261, the distance 200 meters between the estimated purely-lateral position 203 and the candidate position 252 or the candidate position 262, and the distance 300 meters between the estimated purely-lateral position 203 and the candidate position 253 or the candidate position 263 correspond to the candidate distance.

Further, the leaning data presents for each candidate distance, a feature of a reception power value (hereinafter called an estimated reception power value) estimated to be measured at the train when the distance between the position of the generation source of the disturbance wave and the estimated purely-lateral position 203 is the candidate distance.

Then, the disturbance wave generation source estimation device 16 extracts as an extracted candidate distance, a candidate distance for which the feature of the estimated reception power value matches the feature of the measured reception power value extracted in Step S12.

Description will be made on the operation of Step S14, using FIG. 5.

Figure 5:
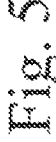
FIG. 5 is a diagram illustrating an example of extracting a candidate distance according to the first embodiment.

(b) in FIG. 5 is the same as what described in FIG. 4.

(a) in FIG. 5 conceptionally illustrates description of the learning data.

In (a) in FIG. 5, "curve of candidate distance 100 meters" is a curve describing a relation between an estimated reception power value (RSSI) and a position (kilometrage) of the on-train monitoring apparatus 14 when the candidate distance is 100 meters, obtained from learning.

"curve of candidate distance 200 meters", "curve of candidate distance 300 meters" and "curve of candidate distance 400 meters" are also the same with "curve of distance 100 meters".

As described, the learning data presents a result of simulating a reception power value which can be measured by the on-train monitoring apparatus 14 when the train travels, while changing the candidate distance.

The learning data describes, for example, a feature of an area (area surrounded by the dotted line in (a) in FIG. 5) near the vertex of the curve illustrated in (a) in FIG. 5, as a feature of the estimated reception power value. For example, the learning data describes, as a feature of an area near the vertex, an inclination of a quadratic function to approximate a curved shape of the area.

The disturbance wave generation source estimation device 16 extracts as an extracted candidate distance, a candidate distance for which the feature of the estimated reception power value matches the feature of the measured reception power value extracted in Step S12.

That is, the disturbance wave generation source estimation device 16 extracts a candidate distance for which an inclination similar to the inclination of the quadratic function to approximate the curved shape of the area near the vertex of (b) in FIG. 5 is described in the learning data.

In the example of FIG. 5, the curved shape near the vertex of "curve of candidate distance 100 meters" in (a) in FIG. 5 is similar to the curved shape near the vertex of the curve of (b) in FIG. 5. Therefore, the inclination of the quadratic function to approximate the curved shape near the vertex of "curve of candidate distance 100 meters" is similar to the inclination of the quadratic function to approximate the curved shape near the vertex of (b) in FIG. 5.

Therefore, the disturbance wave generation source estimation device 16 extracts "candidate distance 100 meters" as an extracted candidate distance.

According to the procedure above, the disturbance wave generation source estimation device 16 is capable of estimating that the generation source of the disturbance wave exists at the position 100 meters away from the estimated purely-lateral position 203.

However, it is unclear whether the generation source of the disturbance wave exists on the right direction or the left direction of the traveling direction of the train.

Therefore, in the process of Step S15 and after, the location direction of the generation source of the disturbance wave is estimated.

In Step S15, the disturbance wave generation source estimation device 16 estimates a transmission power value of the disturbance wave.

The disturbance wave generation source estimation device 16 estimates the transmission power value by "largest reception power value+attenuation amount". The attenuation amount is a power attenuation amount.

The calculation method of the transmission power value will be described below in detail.

Next, in Step S16, the disturbance wave generation source estimation device 16 designates a first position and a second position.

The first position is a candidate position of the generation source of the disturbance wave on the right direction with respect to the traveling direction of the train from the estimated purely-lateral position 203. The second position is a candidate position of the generation source of the disturbance wave on the left direction with respect to the traveling direction of the train from the estimated purely-lateral position 203.

When the disturbance wave generation source estimation device 16 extracts "candidate distance 100 meters" in FIG. 5 as the extracted candidate distance in Step S14, the disturbance wave generation source estimation device 16 designates the candidate position 251 being 100 meters away from the estimated purely-lateral position 203 in the right direction with respect to the traveling direction of the train as the first position, as illustrated in FIG. 6. Further, the disturbance wave generation source estimation device 16 designates the candidate position 261 being 100 meters away from the estimated purely-lateral position 203 in the left direction with respect to the traveling direction of the train as the second position.

Next, in Step S17, the disturbance wave generation source estimation device 16 calculates a verification-target reception power value (first verification-target reception power value and second verification-target reception power value).

More specifically, the disturbance wave generation source estimation device 16 calculates, as the first verification-target reception power value, a reception power value of the disturbance wave that is estimated to be measured at a verification position when the first position is the position of the generation source of the disturbance wave. Further, the disturbance wave generation source estimation device 16 calculates, as the second verification-target reception power value, a reception power value of the disturbance wave that is estimated to be measured at a verification position when the second position is the position of the generation source of the disturbance wave.

The verification position is the position designated in Step S12, and the installation position of the ground monitoring apparatus 13 closest to the estimated purely-lateral position 203.

The disturbance wave generation source estimation device 16 calculates the first verification-target reception power value and the second verification-target reception power value by "transmission power−attenuation amount".

The calculation method of the first verification-target reception power value and the second verification-target reception power value will be described below in detail.

Next, in Step S18, the disturbance wave generation source estimation device 16 estimates the position of the generation source of the disturbance wave.

More specifically, as illustrated in FIG. 6, the verification-target reception power value (first verification-target reception power value and second verification-target reception power value) and a verification reception power value are compared.

The verification reception power value is a reception power value measured at the verification position during the disturbance wave generation period.

Then, the disturbance wave generation source estimation device 16 selects a verification-target reception power value with smaller difference from the verification reception power value, out of the first verification-target reception power value and the second verification-target reception power value. Then, the disturbance wave generation source estimation device 16 estimates a position corresponding to the verification-target reception power value selected, as the position of the generation source of the disturbance wave. For example, when the difference between the first verification-target reception power value and the verification reception power value is smaller than the difference between the second verification-target reception power value and the verification reception power value, the disturbance wave generation source estimation device 16 estimates the first position as the position of the generation source of the disturbance wave.

Lastly, in Step S19, the disturbance wave generation source estimation device 16 outputs the estimated position of the generation source of the disturbance wave obtained in Step S18.

\*\*\*About Configuration Example of Disturbance Wave Generation Source Estimation Device 16\*\*\*

Figure 7:
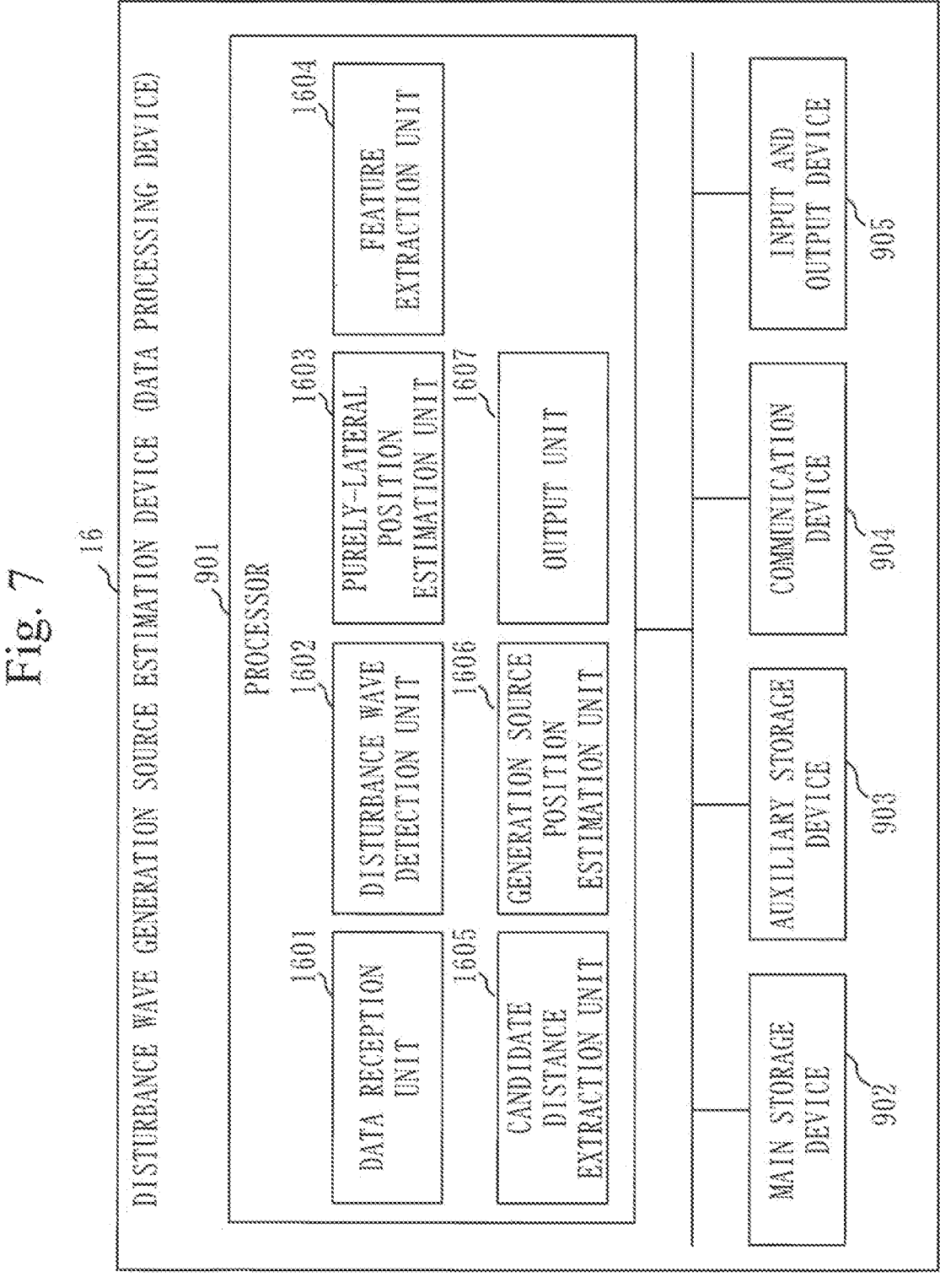
FIG. 7 is a diagram illustrating an example of a hardware configuration of a disturbance wave generation source estimation device according to the first embodiment.

FIG. 7 illustrates an example of a hardware configuration of the disturbance wave generation source estimation device 16 according to the present embodiment.

Figure 8:
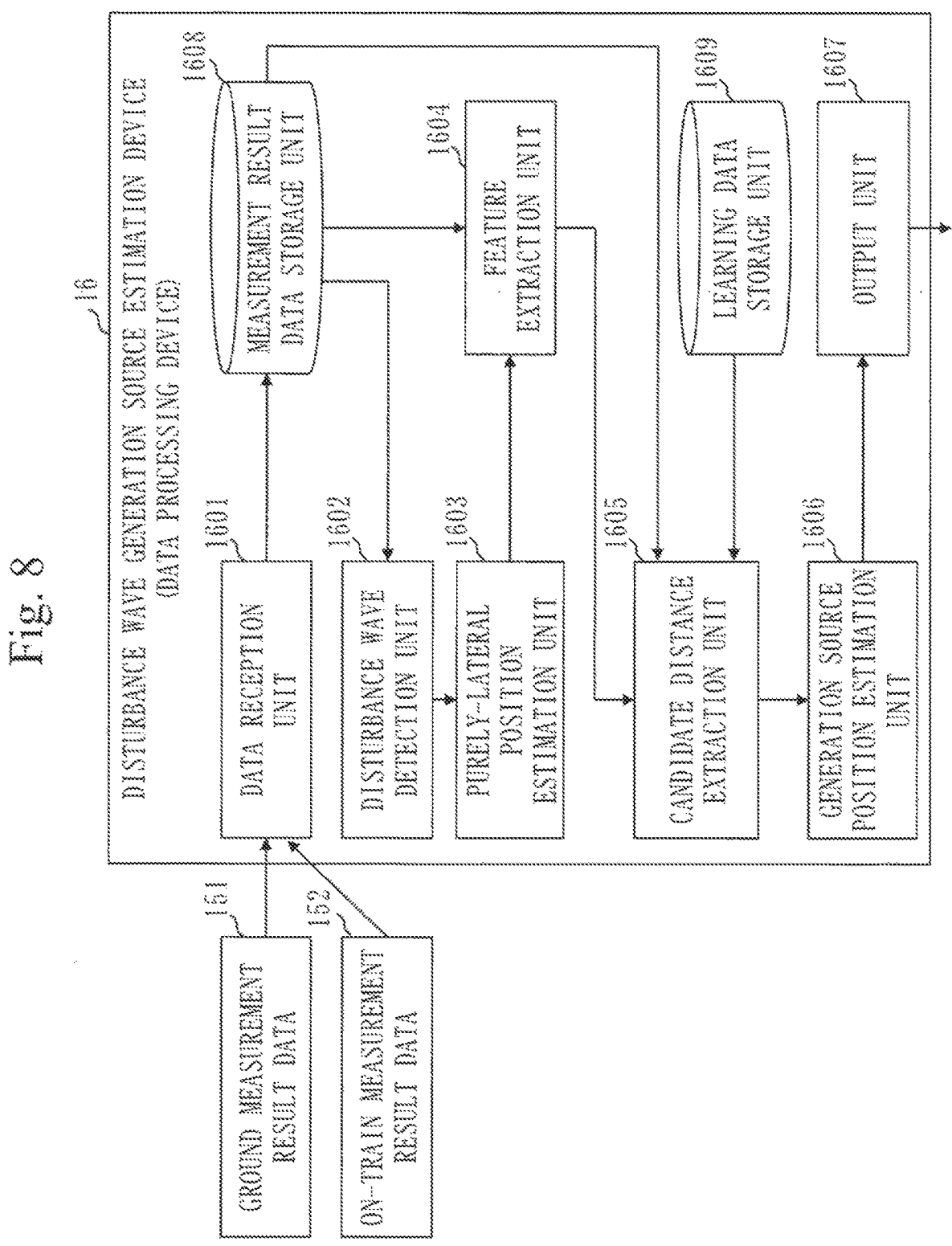
FIG. 8 is a diagram illustrating an example of a functional configuration of the disturbance wave generation source estimation device according to the first embodiment.

Further, FIG. 8 illustrates an example of a functional configuration of the disturbance wave generation source estimation device 16 according to the present embodiment.

First, with reference to FIG. 7, description will be made on the example of the hardware configuration of the disturbance wave generation source estimation device 16.

The disturbance wave generation source estimation device 16 according to the present embodiment is a computer.

The disturbance wave generation source estimation device 16 includes a processor 901, a main storage device 902, an auxiliary storage device 903, a communication device 904 and an input and output device 905, as hardware components.

As illustrated in FIG. 8, the disturbance wave generation source estimation device 16 includes a data reception unit 1601, a disturbance wave detection unit 1602, a purely-lateral position estimation unit 1603, a feature extraction unit 1604, a candidate distance extraction unit 1605, a generation source position estimation unit 1606, an output unit 1607, a measurement result data storage unit 1608 and a learning data storage unit 1609, as a functional configuration. Among them, the functions of the data reception unit 1601, the disturbance wave detection unit 1602, the purely-lateral position estimation unit 1603, the feature extraction unit 1604, the candidate distance extraction unit 1605, the generation source position estimation unit 1606 and the output unit 1607 are realized by programs, for example.

The auxiliary storage device 903 stores the programs to realize the functions of the data reception unit 1601, the disturbance wave detection unit 1602, the purely-lateral position estimation unit 1603, the feature extraction unit 1604, the candidate distance extraction unit 1605, the generation source position estimation unit 1606 and the output unit 1607.

These programs are loaded into the main storage device 902 from the auxiliary storage device 903. Then, the processor 901 executes these programs, and performs operations of the data reception unit 1601, the disturbance wave detection unit 1602, the purely-lateral position estimation unit 1603, the feature extraction unit 1604, the candidate distance extraction unit 1605, the generation source position estimation unit 1606 and the output unit 1607, to be described later.

FIG. 3 schematically describes a state wherein the processor 901 executes the programs to realize the functions of the data reception unit 1601, the disturbance wave detection unit 1602, the purely-lateral position estimation unit 1603, the feature extraction unit 1604, the candidate distance extraction unit 1605, the generation source position estimation unit 1606 and the output unit 1607.

The measurement result data storage unit 1608 and the learning data storage unit 1609 are realized by the main storage device 902 or the auxiliary storage device 903.

The communication device 904 is used for communication with the data collection device 15.

The input and output device 905 includes, a mouse, a keyboard and a display, for example.

Next, description will be made on the example of the functional configuration of the disturbance wave generation source estimation device 16 with reference to FIG. 8.

The data reception unit 1601 obtains ground measurement result data 151 and on-train measurement result data 152.

In the ground measurement result data 151, the reception power value measured by the ground monitoring apparatus 13 is indicated for each clock time. In the on-train measurement result data 152, the reception power value measured by the on-train monitoring apparatus 14 is indicated for each clock time. The ground measurement result data 151 and the on-train measurement result data 152 will be described below in detail.

The disturbance wave detection unit 1602 analyzes the ground measurement result data 151, and detects that a disturbance wave is generated while the train is traveling. Further, the disturbance wave detection unit 1602 specifies a disturbance wave generation period.

The purely-lateral position estimation unit 1603 analyzes the on-train measurement result data 152, and estimates the estimated purely-lateral position 203. The estimated purely-lateral position 203 is a position on the traveling track 20 in the purely-lateral direction with respect to the position of the generation source of the disturbance wave, as described above.

The process performed by the purely-lateral position estimation unit 1603 corresponds to a purely-lateral position estimation process.

The feature extraction unit 1604 analyzes the on-train measurement result data 152, and extracts a feature of the measured reception power value being the reception power value during the disturbance wave generation period.

The process performed by the feature extraction unit 1604 corresponds to a feature extraction process.

The candidate distance extraction unit 1605 extracts as the extracted candidate distance. a candidate distance for which the feature of the estimated reception power value matches the feature of the measured reception power value, from the learning data.

The process performed by the candidate distance extraction unit 1605 corresponds to a candidate distance extraction process.

The generation source position estimation unit 1606 estimates a position being distant from the estimated purely-lateral position 203 by the extracted candidate distance, as the position of the generation source of the disturbance wave.

More specifically, the generation source position estimation unit 1606 estimates either the first position or the second position as the position of the generation source of the disturbance wave.

The process performed by the generation source position estimation unit 1606 corresponds to a generation source position estimation process.

The output unit 1607 outputs the estimated position of the generation source of the disturbance wave obtained by the generation source position estimation unit 1606.

FIG. 9 illustrates an example of the ground measurement result data 151 and the on-train measurement result data 152.

(a) in FIG. 9 illustrates an example of the ground measurement result data 151, and (b) in FIG. 9 illustrates an example of the on-train measurement result data 152.

The ground measurement result data 151 is data obtained by summarizing measurement results at the plurality of ground monitoring apparatuses 13 by the data collection device 15.

Further, the on-train measurement result data 152 illustrated in (b) in FIG. 9 is data obtained by summarizing measurement results at the plurality of on-train monitoring apparatuses 14 by the data collection device 15.

In the column of "clock time" of the ground measurement result data 151, a clock time when each ground monitoring apparatus 13 measures an RSSI is indicated.

In the columns of "X-coordinate" and "Y-coordinate", coordinates of an installation position of each ground monitoring apparatus 13 is indicated. Since the ground monitoring apparatus 13 is fixed, "X-coordinate" and "Y-coordinate" of the same ground monitoring apparatus 13 are fixed values.

In the column of "ground wireless apparatus number", an identifier of the ground wireless communication apparatus 10 an RSSI of which is measured by each ground monitoring apparatus 13 is indicated.

In the columns of "on-train wireless apparatus number", an identifier of the on-train wireless communication apparatus 11 estimated to be a transmission source of a radio wave for which an RSSI is measured by each ground monitoring apparatus 13 is indicated. The ground monitoring apparatus 13 only measures the RSSI, and is incapable of estimating the transmission source of the radio wave. However, by analyzing an operation timetable of trains by a management system not illustrated, for example, it is possible to estimate the train which travels near the ground wireless communication apparatus 10 at the clock time indicated in the column of "clock time", and to extract the on-train wireless communication apparatus 11 mounted on the train estimated. The identifier of the on-train wireless communication apparatus 11 indicated in the column of "on-train wireless apparatus number" is only an estimated result. Therefore, even when the ground monitoring apparatus 13 measures an RSSI of the disturbance wave, the identifier of the on-train wireless communication apparatus 11 of the train traveling near the ground wireless communication apparatus 10 at the corresponding clock time is indicated in the column of "on-train wireless apparatus number".

In the column of "RSSI", a value of the RSSI measured by each ground monitoring apparatus 13 is indicated.

In the column of "clock time" of the on-train measurement result data 152, the clock time when each on-train monitoring apparatus 14 measures an RSSI is indicated.

In the columns of "X-coordinate" and "Y-coordinate", coordinates of a location position of each on-train monitoring apparatus 14 at each clock time are indicated. Since the on-train monitoring apparatus 14 travels with the train, the values of "X-coordinate" and "Y-coordinate" of even the same on-train monitoring apparatus 14 change with the lapse of time. The values of "X-coordinate" and "Y-coordinate" can be obtained from, for example, a GPS (Global Positioning System) apparatus mounted on the train.

In the column of "ground wireless apparatus number", an identifier of the ground wireless communication apparatus 10 estimated to be a transmission source of the radio wave for which the RSSI is measured by each on-train monitoring apparatus 14 is indicated. As with the ground monitoring apparatus 13, the on-train monitoring apparatus 14 only measures an RSSI and is incapable of estimating the transmission source of the radio wave. However, by analyzing a operation timetable of trains by a management system not illustrated, for example, it is possible to estimate a traveling position of the train at the clock time indicated in the column of "clock time", and to extract the ground wireless communication apparatus 10 near the traveling position estimated. The identifier of the ground wireless communication apparatus 10 indicated in the column of "ground wireless apparatus number" is only an estimated result. Therefore, even when the on-train monitoring apparatus 14 measures the RSSI of the disturbance wave, an identifier of the ground wireless communication apparatus 10 near the estimated traveling position of the train at the corresponding clock time is indicated in the column of "ground wireless apparatus number".

In the column of "on-train wireless apparatus number", an identifier of the on-train wireless communication apparatus 11 to be measured the RSSI by each on-train monitoring apparatus 14 is indicated.

In the column of "kilometrage", a kilometrage of the train whereon each on-train monitoring apparatus 14 is mounted is indicated. The value of "kilometrage" can be also obtained from the GPS apparatus mounted on the train, for example.

In the column of "RSSI", a value of the RSSI measured by the on-train monitoring apparatus 14 is indicated.

FIG. 10 illustrates an example of learning data 500.

The learning data 500 is data obtained by prior learning.

The learning data 500 indicates a plurality of combinations of coefficient values and candidate distances, and indicates an approximating result for each combination.

Each of the plurality of coefficient values corresponds to a plurality of visibility conditions. The visibility conditions are conditions related to visibility for the radio wave.

The approximating result is a feature of an estimated reception power value being a reception power value estimated to be measured at the train. More specifically, the learning data 500 indicates an inclination of a quadratic function approximating the estimated reception power value illustrated in (a) in FIG. 5, as the approximating result.

That is, the learning data 500 indicates for each combination, a feature (inclination of the quadratic function) of an estimated reception power value in a case where a distance between the position of the generation source of the disturbance wave and the estimated purely-lateral position 203 is a candidate distance included in the relevant combination, and where the visibility condition at the position of the generation source of the disturbance wave is a visibility condition corresponding to the coefficient value included in the relevant combination.

As described above, in the present embodiment, a transmission power value at the generation source of the disturbance wave is calculated by "largest reception power value+ attenuation amount". Further, in the present embodiment, a first verification-target reception power value and a second verification-target power value are calculated by "transmission power−attenuation amount". "Attenuation amount" is changed not only by a distance but also by whether the visibility of peripheral environment is good or not. Therefore, the learning data 500 indicates a learning result of the feature of the estimated reception power value for each combination of the candidate distance and the coefficient value corresponding to the visibility condition.

The candidate distance extraction unit 1605 calculates "attenuation amount", using the coefficient values and the candidate distances indicated in the learning data 500.

Figure 11:
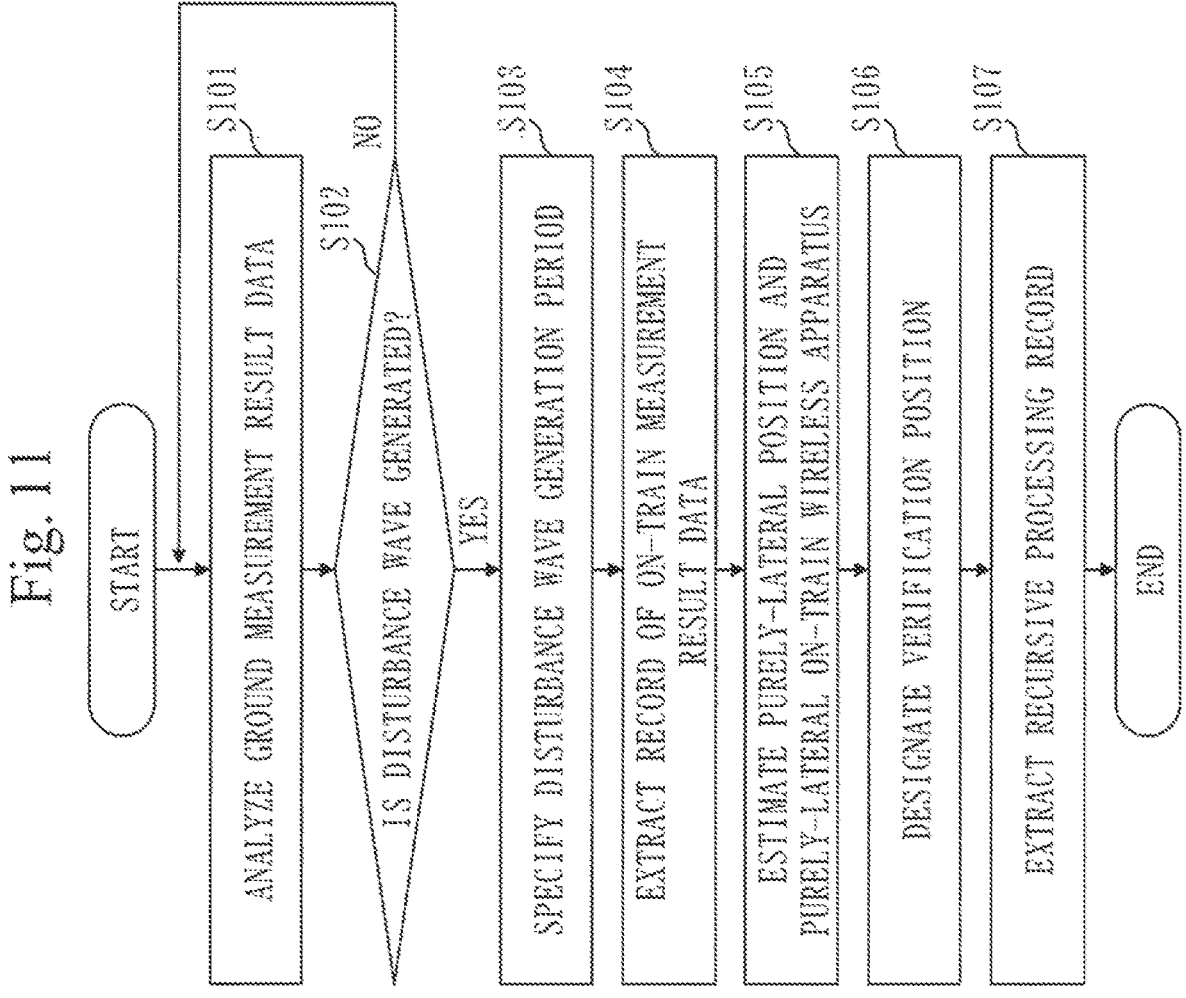
FIG. 11 is a flowchart illustrating an operation example of the disturbance wave generation source estimation device according to the first embodiment.

FIG. 11 illustrates an operation example of the disturbance wave detection unit 1602 and the purely-lateral position estimation unit 1603 according to the present embodiment.

Hereinafter, description will be made on an operation example of the disturbance wave detection unit 1602 and the purely-lateral position estimation unit 1603 according to the present embodiment with reference to FIG. 11.

The procedure in FIG. 11 shall be repeated at a fixed cycle.

First, in Step S101, the disturbance wave detection unit 1602 obtains ground measurement result data 151 from the measurement result data storage unit 1608, and analyzes the ground measurement result data 151.

Then, in Step S102, the disturbance wave detection unit 1602 determines whether a disturbance wave is generated. More specifically, the disturbance wave detection unit 1602 analyzes RSSIs of the plurality of ground wireless communication apparatuses 10 indicated in the ground measurement result data 151, and detects generation of the disturbance wave when an abnormality occurs in any of the RSSIs of the ground wireless communication apparatuses 10.

When the disturbance wave is generated, the disturbance wave detection unit 1602 specifies a disturbance generation period in Step S103.

Meanwhile, when a disturbance wave is not generated, the processing returns to Step S101.

Figure 12:
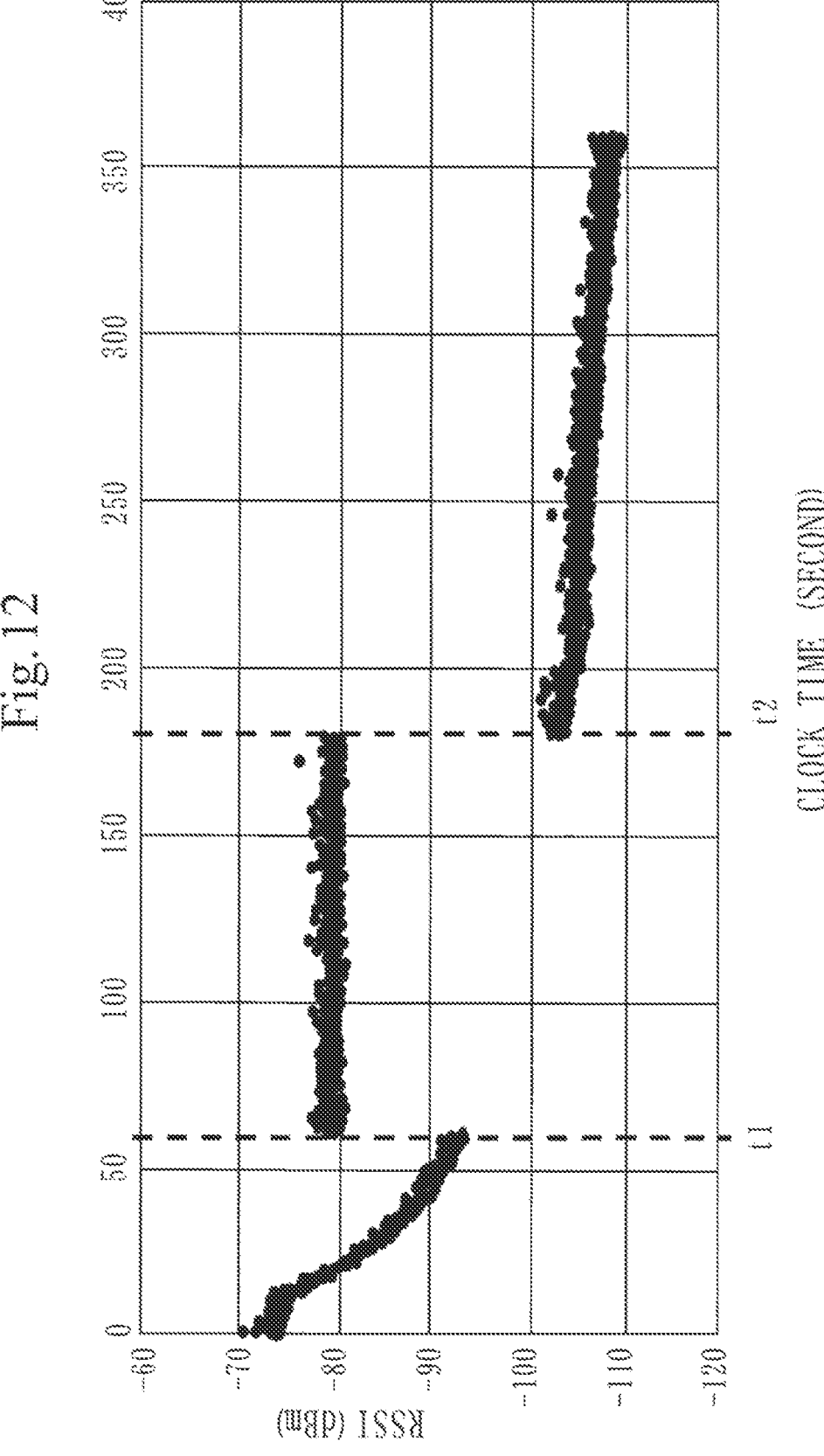
FIG. 12 is a diagram illustrating an example of a disturbance wave generation period according to the first embodiment.

FIG. 12 illustrates a time transition of the RSSI measured at the ground monitoring apparatus 13 when the disturbance wave is generated. In FIG. 12, the horizontal axis expresses a clock time, and the vertical axis expresses an RSSI.

Since the position of the ground monitoring apparatus 13 is not changed, the RSSI measured at the ground monitoring apparatus 13 is affected by a disturbance wave only while the disturbance wave is being generated. Therefore, the disturbance wave detection unit 1602 analyzing the ground measurement result data 151 indicating the RSSI measured at the ground monitoring apparatus 13 makes it possible to specify generation of the disturbance wave and the disturbance wave generation time.

For example, in the example in FIG. 12, the disturbance wave detection unit 1602 determines the time between time t1 and time t2 wherein the RSSI measured by the ground monitoring apparatus 13 is nonlinear, as the disturbance wave generation time.

Next, in Step S104, the disturbance wave detection unit 1602 extracts a record of the on-train measurement result data 152.

Herein, the ground wireless communication apparatus 10 whose ground wireless apparatus number is indicated in a record corresponding to the disturbance radio wave generation period of the ground measurement result data 151 is called "corresponding ground wireless apparatus". Further, the on-train wireless communication apparatus 11 whose on-train wireless apparatus number is indicated in the record corresponding to the disturbance radio wave generation period of the ground measurement result data 151 is called "corresponding on-train wireless apparatus". "Corresponding ground wireless apparatus" is a ground wireless communication apparatus 10 at which an abnormality occurs in the RSSI. Further, "corresponding on-train wireless apparatus" is an on-train wireless communication apparatus 11 which has communicated with "corresponding ground wireless apparatus" during the disturbance wave generation period.

The disturbance wave detection unit 1602 extracts a record corresponding to the disturbance radio wave generation period, wherein a combination of "corresponding ground wireless apparatus" and "corresponding on-train wireless apparatus" are indicated in the ground wireless apparatus number and the on-train wireless apparatus number, from the on-train measurement result data 152.

When there are a plurality of combinations of "corresponding ground wireless apparatus" and "corresponding on-train wireless apparatus" in the records corresponding to the disturbance radio wave generation period of the ground measurement result data 151, the disturbance wave detection unit 1602 extracts the records corresponding to each combination from the on-train measurement result data 152.

The disturbance wave detection unit 1602 outputs the records of the on-train measurement result data 152 extracted in Step S104 to the purely-lateral position estimation unit 1603.

Next, in Step S105, the purely-lateral position estimation unit 1603 estimates a purely-lateral position and a purely-lateral-on-train wireless apparatus.

Specifically, the purely-lateral position estimation unit 1603 extracts the largest RSSI in the RSSIs indicated in the records extracted by the disturbance wave detection unit 1602 in Step S104. Then, the purely-lateral position estimation unit 1603 extracts a record wherein the largest RSSI is indicated. The largest RSSI extracted in Step S105 is called "largest RSSI".

Then, the purely-lateral position estimation unit 1603 estimates as the purely-lateral position, a position specified by "X-coordinate" and "Y-coordinate" of the record extracted wherein the largest RSSI is indicated. The purely-lateral position estimated in Step S105 corresponds to the estimated purely-lateral position 203. That is, the purely-lateral position estimation unit 1603 obtains the estimated purely-lateral position 203 on the traveling track 20 of a train whereon the on-train monitoring apparatus 14 for which the largest RSSI is measured is mounted.

Further, the purely-lateral position estimation unit 1603 estimates as the purely-lateral-on-train wireless apparatus, the on-train wireless communication apparatus 11 specified by "on-train wireless apparatus number" of the record extracted wherein the largest RSSI is indicated. That is, the purely-lateral position estimation unit 1603 estimates as the purely-lateral-on-train wireless apparatus, the on-train wireless communication apparatus 11 mounted on the train whereon the on-train monitoring apparatus 14 for which the largest RSSI is measured is mounted.

Next, in Step S106, the purely-lateral position estimation unit 1603 designates a verification position.

The purely-lateral position estimation unit 1603 refers to installation position data of the ground monitoring apparatus 13 not illustrated, for example, and designates as the verification position, a location position of the ground monitoring apparatus 13 closest to the estimated purely-lateral position 203.

Next, in Step S107, the purely-lateral position estimation unit 1603 extracts a recursive processing record.

Specifically, the purely-lateral position estimation unit 1603 extracts as a recursive processing record, a record wherein the number of the purely-lateral-on-train wireless apparatus is indicated in "on-train wireless apparatus number" from among the records extracted by the disturbance wave detection unit 1602 in Step S104.

The recursive processing record is a record used for recursive processing for extracting a feature of the measured reception power value by the feature extraction unit 1604.

The purely-lateral position estimation unit 1603 may extract as the recursive processing record, for example, only a record indicating the number of the purely-lateral-on-train wireless apparatus in "on-train wireless apparatus number", and indicating an RSSI wherein a difference from the largest RSSI is less than 10%.

Further, the purely-lateral position estimation unit 1603 may extract as the recursive processing record, for example, only a record indicating the number of the purely-lateral-on-train wireless apparatus in "on-train wireless apparatus number", and having a clock time whose difference from the clock time of the record of the largest RSSI is within ±1 second.

"less than 10%" and "within ±1 second" above are only examples. Further, the purely-lateral position estimation unit 1603 may extract the recursive processing record in a manner different from what described above.

The purely-lateral position estimation unit 1603 outputs the recursive processing record extracted to the feature extraction unit 1604.

FIG. 13 illustrates an operation example of the feature extraction unit 1604, the candidate distance extraction unit 1605, the generation source position estimation unit 1606 and the output unit 1607 according to the present embodiment.

Hereinafter, description will be made on the operation example of the feature extraction unit 1604, the candidate distance extraction unit 1605, the generation source position estimation unit 1606 and the output unit 1607 according to the present embodiment, with reference to FIG. 13.

First, in Step S201, the feature extraction unit 1604 performs recursive processing using the recursive processing record output from the purely-lateral position estimation unit 1603.

Then, in Step S202, the feature extraction unit 1604 extracts the feature of the measured reception power value (RSSI) indicated in the recursive processing record.

That is, the feature extraction unit 1604 calculates a quadratic function approximating a curved shape of the area in the vicinity of the vertex illustrated in FIG. 4, by recursive processing.

Then, the feature extraction unit 1604 notifies the candidate distance extraction unit 1605 of the quadratic function calculated, as the feature of the measured reception power value (RSSI).

Next, in Step S203, the candidate distance extraction unit 1605 extracts a coefficient value and a candidate distance from the learning data 500.

Specifically, the candidate distance extraction unit 1605 extracts the coefficient value and the candidate distance of the record indicating an approximating result similar to the quadratic function notified from the feature extraction unit 1604.

The operation of Step S203 corresponds to the operation described above using FIG. 5.

For example, the candidate distance extraction unit 1605 extracts a coefficient value and a candidate distance of a record indicating an approximating result wherein a difference from the quadratic function notified from the feature extraction unit 1604 is within 10%. For example, when the inclination of the quadratic function notified from the feature extraction unit 1604 is "−1900", the candidate distance extraction unit 1605 selects a record with an approximating result of "−2000" in the learning data 500 of FIG. 10. As a result, the candidate distance extraction unit 1605 extracts a coefficient value "1.5" and a candidate distance "25 m".

The candidate distance extraction unit 1605 notifies the generation source position estimation unit 1606 of an extracted coefficient value and an extracted candidate distance that are extracted.

Next, in Step S204, the generation source position estimation unit 1606 estimates a transmission power value of the disturbance generation source.

Specifically, the generation source position estimation unit 1606 estimates a transmission power by "largest RSSI+attenuation amount". The transmission power value obtained by estimation is called an estimated transmission power value.

"Largest RSSI" is the largest RSSI specified in Step S105. The generation source position estimation unit 1606 inquires the largest RSSI of the purely-lateral position estimation unit 1603, and obtains the largest RSSI from the purely-lateral position estimation unit 1603.

The generation source position estimation unit 1606 calculates "attenuation amount" by "coefficient value×candidate distance". The coefficient value and the candidate distance are the extracted coefficient value and the extracted candidate distance notified from the candidate distance extraction unit 1605.

Next, in Step S205, the generation source position estimation unit 1606 designates the first position and the second position.

Specifically, the generation source position estimation unit 1606 designates, as the first position, a position away from the estimated purely-lateral position 203 by the candidate distance in the right direction with respect to the traveling direction of the train. Further, the generation source position estimation unit 1606 designates, as the second position, a position away from the estimated purely-lateral position 203 by the candidate direction in the left direction with respect to the traveling direction of the train.

The generation source position estimation unit 1606 inquires the estimated purely-lateral position 203 of the purely-lateral position estimation unit 1603, and obtains the estimated purely-lateral position 203 from the purely-lateral position estimation unit 1603. Further, the candidate distance is the extracted candidate distance notified from the candidate distance extraction unit 1605.

Next, in Step S206, the generation source position estimation unit 1606 calculates the verification-target reception power values (first verification-target reception power value and second verification-target reception power value).

As described above, the first verification-target reception power value is a reception power value (theoretical value) of a disturbance wave estimated to be measured at a verification position when the first position is the position of the generation source of the disturbance wave. Further, the second verification-target reception power value is a reception power value (theoretical value) of the disturbance wave estimated to be measured at a verification position when the second position is the position of the generation source of the disturbance wave.

Specifically, the generation source position estimation unit 1606 calculates the first verification-target reception power value and the second verification-target reception power value as follows.

First verification-target reception power value=estimated transmission power value−first attenuation amount First attenuation amount=coefficient value×(distance between first position and verification position)

Second verification-target reception power value=estimated transmission power value−second attenuation amount Second attenuation amount=coefficient value×(distance between second position and verification position)

The coefficient value is an extracted coefficient value notified from the candidate distance extraction unit 1605.

The first attenuation amount is a power attenuation amount of the disturbance wave at the verification position when the first position is the position of the generation source of the disturbance wave. Further, the second attenuation amount is a power attenuation amount of the disturbance wave at the verification position when the second position is the position of the generation source of the disturbance wave, The generation source position estimation unit 1606 inquires the verification position of the purely-lateral position estimation unit 1603, and obtains the verification position from the purely-lateral position estimation unit 1603.

Next, in Step S207, the generation source position estimation unit 1606 obtains the verification reception power value.

The verification reception power value is a reception power value (measured value) measured at the verification position during the disturbance wave generation period.

The generation source position estimation unit 1606 inquires of the purely-lateral position estimation unit 1603 a ground wireless apparatus number of the ground wireless communication apparatus 10 being a measurement target of the ground monitoring apparatus 13 corresponding to the verification position, and obtains the ground wireless apparatus number of the concerned ground wireless communication apparatus 10 from the purely-lateral position estimation unit 1603.

Further, the generation source position estimation unit 1606 inquires a start time and a finish time of the disturbance wave generation period of the disturbance wave detection unit 1602, and obtains the start time and the finish time of the disturbance wave generation period from the disturbance wave detection unit 1602.

Then, the disturbance wave detection unit 1602 obtains, as a verification reception power value, an RSSI indicated in the record of the ground measurement result data 151 corresponding to the start time and the finish time of the disturbance wave generation period obtained from the disturbance wave detection unit 1602, and corresponding to the ground wireless apparatus number obtained from the purely-lateral position estimation unit 1603.

Next, in Step S208, the generation source position estimation unit 1606 compares the verification-target reception power values (first verification-target reception power value and second verification-target reception power value) with the verification reception power value.

For example, the generation source position estimation unit 1606 compares the verification-target reception power values (first verification-target reception power value and second verification-target reception power value) with a mean value of verification reception power values. The generation source position estimation unit 1606 may use any of a median value, a largest value and a smallest value of the verification reception power values, for example, instead of the mean value. Further, the generation source position estimation unit 1606 may compare the verification-target reception power values (first verification-target reception power value and second verification-target reception power value) with the verification reception power value in a manner different from the above.

Next, in Step S209, the generation source position estimation unit 1606 estimates the position of the generation source of the disturbance wave.

That is, the generation source position estimation unit 1606 selects a verification-target reception power value whose difference from the verification reception power value is smaller among the first verification-target reception power value and the second verification-target reception power value. Then, the generation source position estimation unit 1606 estimates as the position of the generation source of the disturbance wave, the position corresponding to the verification-target reception power value selected.

For example, when the difference between the first verification-target reception power value and the verification reception power value is smaller than the difference between the second verification-target reception power value and the verification reception power value, the generation source position estimation unit 1606 estimates the first position as the position of the generation source of the disturbance wave.

Lastly, in Step S210, the output unit 1607 outputs the estimated position of the generation source of the disturbance wave obtained in Step S209 to the input and output device 905 (display), for example.

In the above, description has been made on the assumption that only one combination of a coefficient value and a candidate distance is extracted in step S203 of FIG. 13.

In Step S203, there is a case wherein two or more combinations of coefficient values and candidate distances are extracted. For example, it is supposed that the inclination of the quadratic function notified from the feature extraction unit 1604 is "−1900". Further, it is assumed that there exist in the learning data 500 a record indicating an approximating result "−2000" for a combination of a coefficient value "1.5" and a candidate distance "25 m", and a record indicating an approximating result "−1800" for a combination of a coefficient value "1.5" and a candidate distance "50 m". In this case, the candidate distance extraction unit 1605 extracts the record indicating the approximating result "−2000" and the record indicating the approximating result "−1800".

When two or more combinations of coefficient values and candidate distances are extracted in Step S203, the processing from Step S204 through Step S208 is performed for each combination of the coefficient value and the candidate distance.

In the example above, the processing from Step S204 through Step S208 is performed for the combination of the coefficient value "1.5" and the candidate distance "25 m", and the first position, the second position, the first verification-target reception power and the second verification-target reception power are obtained. Further, processing from Step 204 through Step S208 is performed for the combination of the coefficient value "1.5" and the candidate distance "50 m", and the first position, the second position, the first verification-target reception power value and the second verification-target reception power value are obtained.

Then, in Step S209, the generation source position estimation unit 1606 compares each of the plurality of first verification-target reception power values and the plurality of second verification-target reception power values, with the verification reception power values. Then, the generation source position estimation unit 1606 selects a verification-target reception power value whose difference from the verification reception power values is the smallest, and estimates as the position of the generation source of the disturbance wave, a position corresponding to the verification-target reception power value selected.

*Description of Effect of Embodiment*

As described above, according to the present embodiment, when a disturbance wave is detected, it is possible to estimate the position of the generation source of the disturbance wave early. Therefore, according to the present embodiment, it is possible to take a countermeasure corresponding to the estimated position of the generation source of the disturbance wave rapidly. As a result, it is possible to prevent generation of more serious situations such as communication failure, etc. beforehand.

Second Embodiment

In First Embodiment, description has been made on an example wherein the on-train wireless communication apparatus 11 uses a non-directional antenna. In the present embodiment, description will be made on an example wherein the on-train wireless communication apparatus 11 uses two directional antennas having directivity, as illustrated in FIG. 14.

Figure 14:
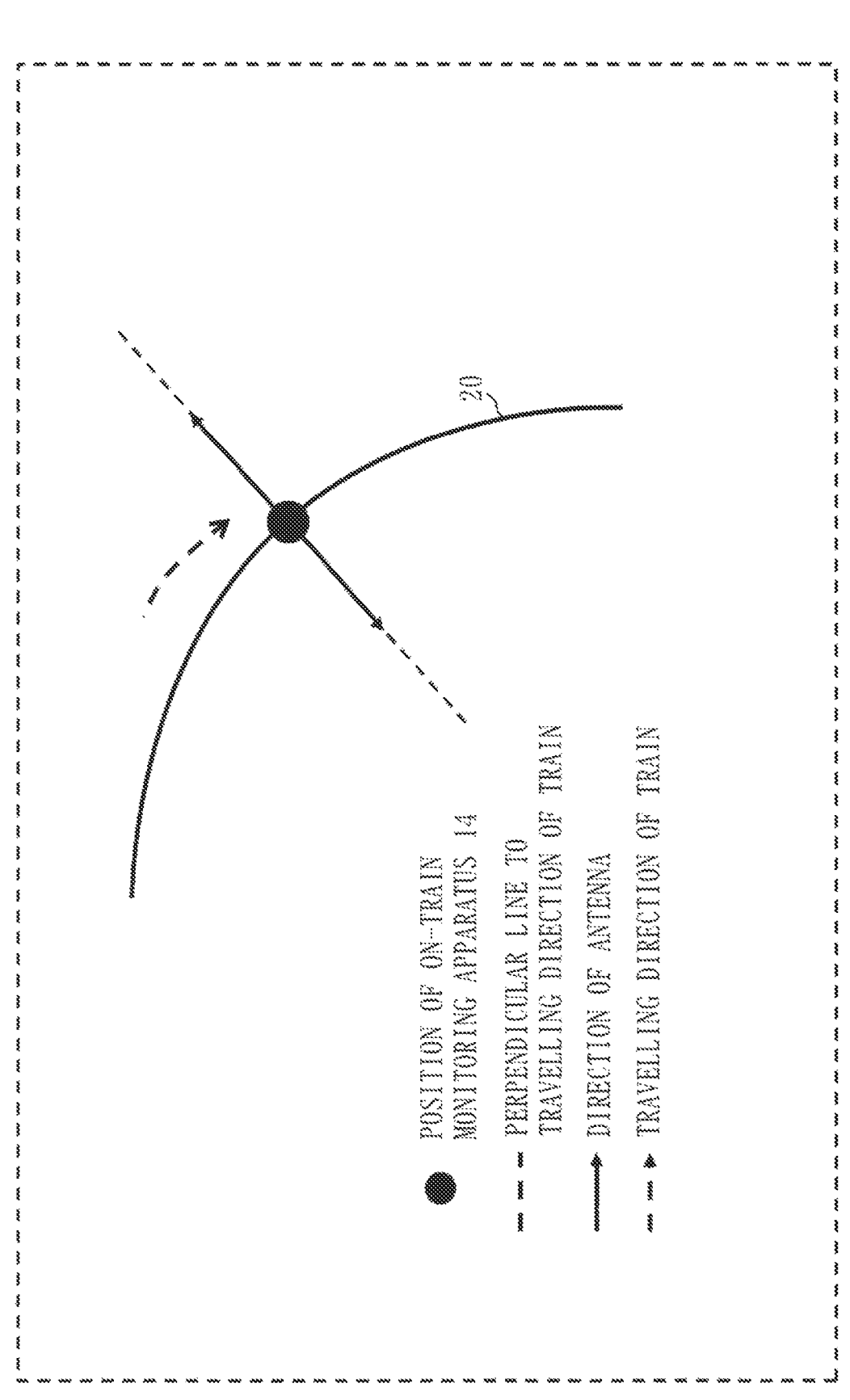
FIG. 14 is a diagram illustrating an example of installing an antenna according to a second embodiment.

In FIG. 14, two directional antennas are provided in vertical directions, i.e., in right and left directions with respect to the traveling direction of the train. The directional antenna provided in the right direction with respect to the traveling direction of the train is called a right-directional antenna. The right-directional antenna has a directivity direction of right direction with respect to the traveling direction of the train, and receives a radio wave from the right direction. An antenna having a directivity, provided in the left direction with respect to the traveling direction of the train is called a left-directional antenna. The left-directional antenna has a directivity direction of left direction with respect to the traveling direction of the train, and receives a radio wave from the left direction.

The right-directional antenna and the left-directional antenna are arranged so that a direction with the largest reception power is the direction vertical to the traveling direction of the train in the radiation patterns in FIG. 16 to be described below. The right-directional antenna and the left-directional antenna may be arranged in any position in the train; however, as illustrated in FIG. 14, they can be arranged in the vicinity of the on-train monitoring apparatus 14, for example. The on-train monitoring apparatus 14 measures a reception power value of the radio wave received by the right-directional antenna, and measures a reception power value of the radio wave received by the left-directional antenna.

In the directional antennas, only the reception power values of the radio wave arrived from a specific direction (directive direction) become especially large. A pattern wherein reception power values are graphed for each arrival direction of the radio wave seen from an antenna is called a radiation pattern (Reference Literature 1). According to the radiation pattern, in a directional antenna, a reception power value of the radio wave received from a direction of a high gain is high, and a reception power value of the radio wave received from a direction of a low gain is low.

Reference Literature 1, FIG. 6: Typical Radiation Pattern of a Directional Antenna with Calibrated Lobes <https://www.cisco.com/c/ja jp/support/docs/wireless-mobility/wireless-lan-wlan/8206 8-omni-vs-direct.html>

Figure 15:
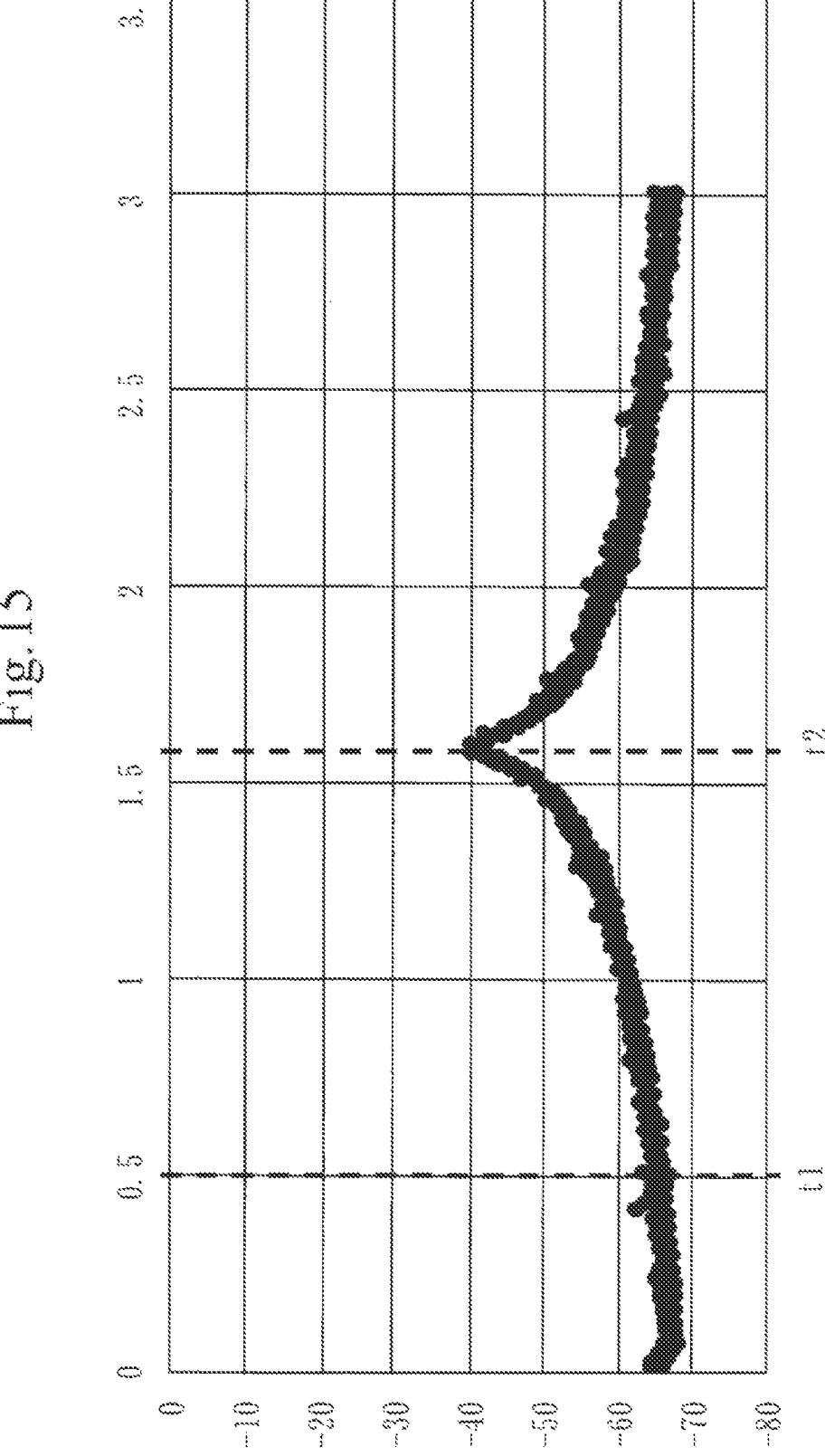
FIG. 15 is a diagram illustrating an example of a reception power value measured when a non-directional antenna receives a radio wave according to the second embodiment.

FIG. 15 illustrates an example of a reception power value measured by the on-train monitoring apparatus 14 in a case wherein a non-directional antenna receives a radio wave.

Figure 16:
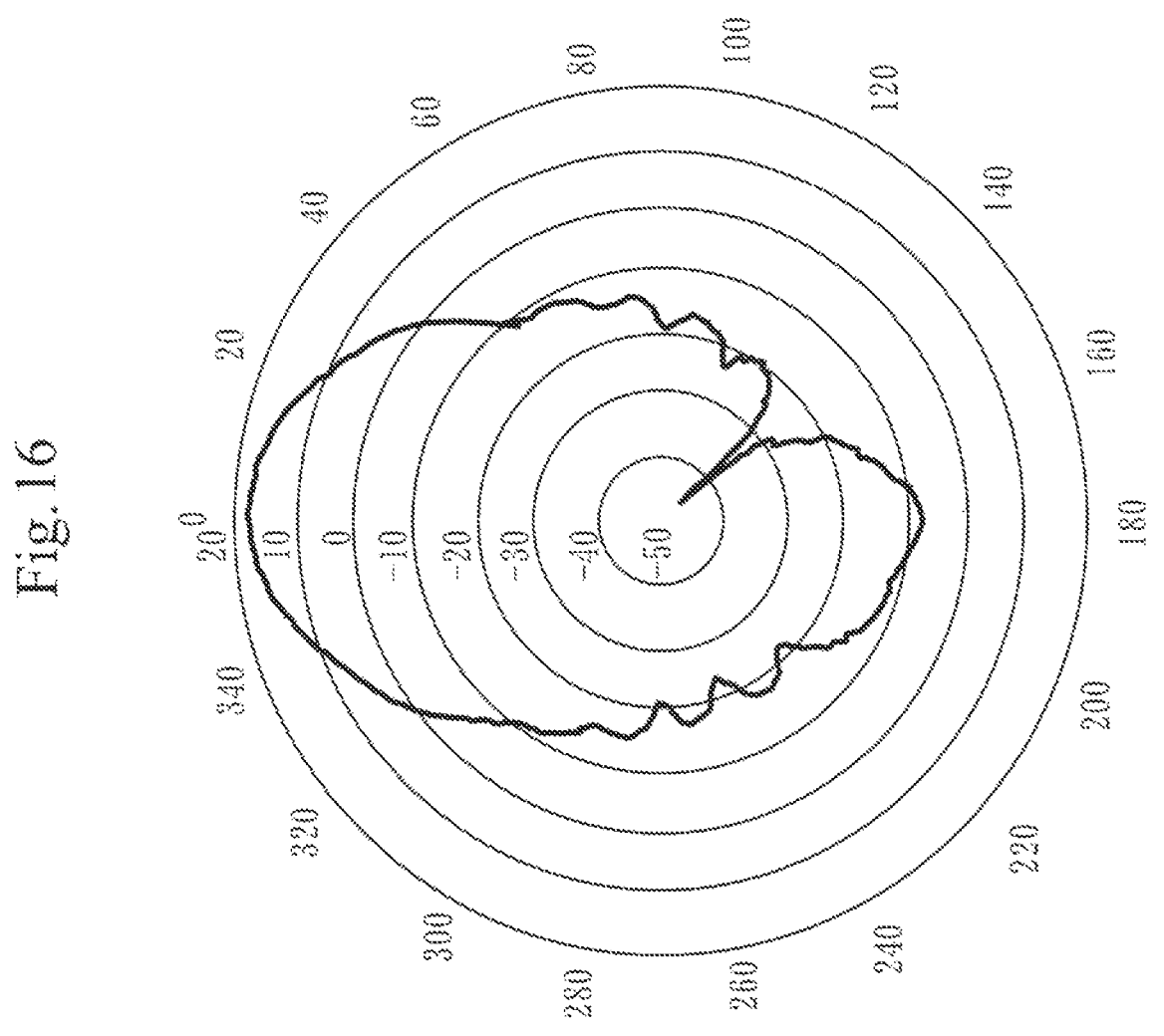

FIG. 16 illustrates an example of a radiation pattern of a directional antenna.

Figure 17:
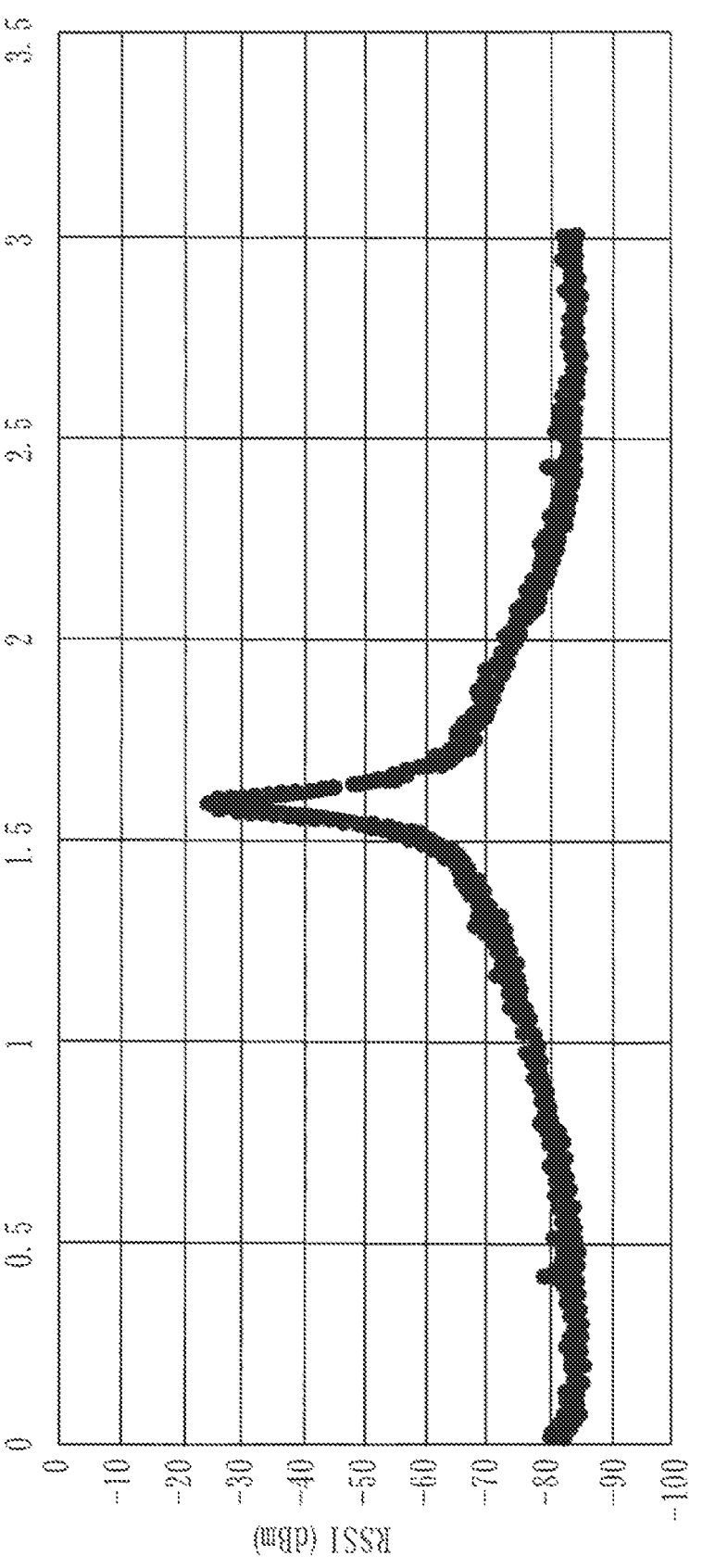
FIG. 17 is a diagram illustrating an example of a reception power value measured when a right-directional antenna receives a radio wave according to the second embodiment.
Figure 18:
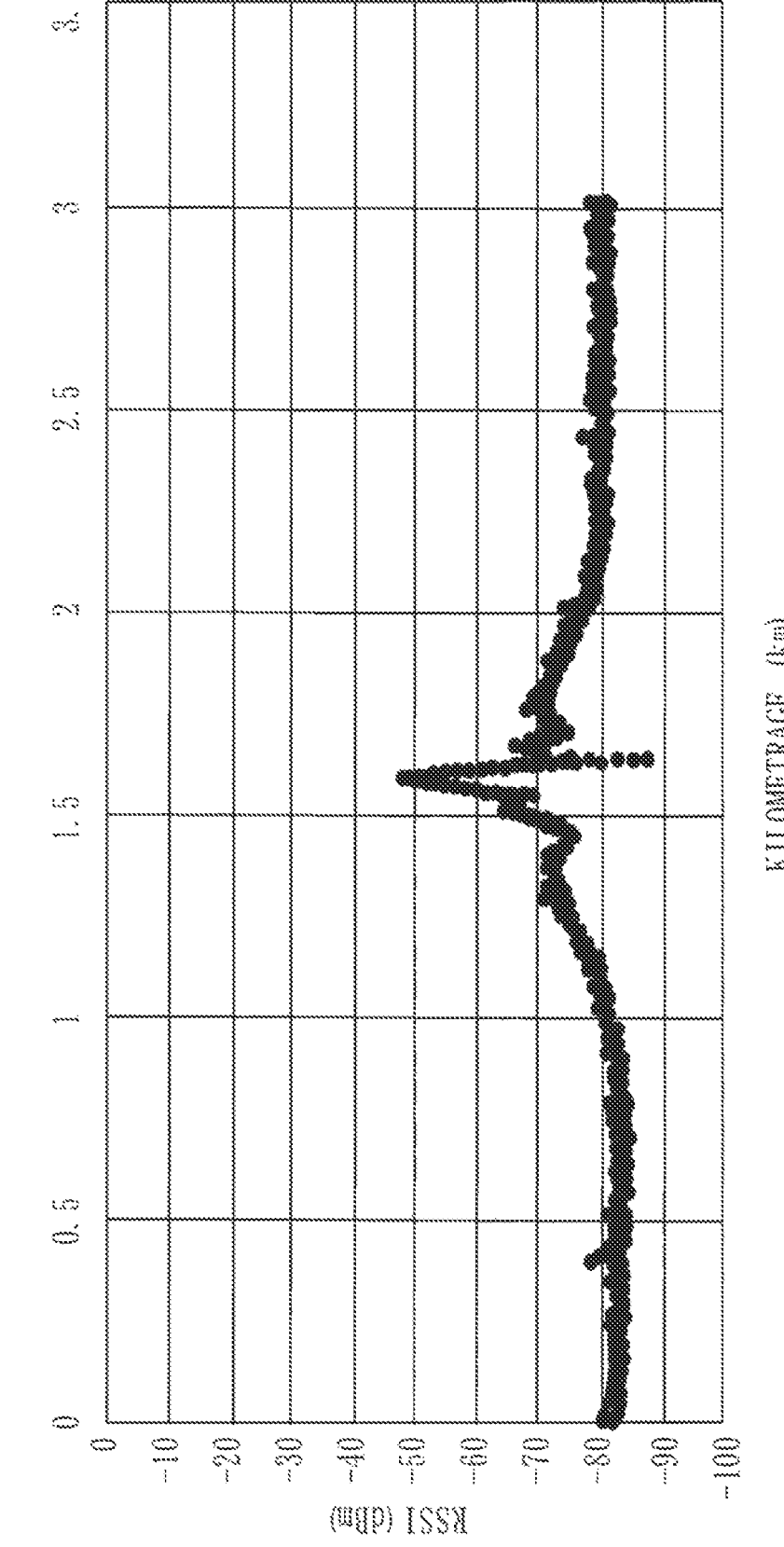
FIG. 18 is a diagram illustrating an example of a reception power value measured when a left-directional antenna receives a radio wave according to the second embodiment.

FIG. 17 illustrates an example of a reception power value measured by the on-train monitoring apparatus 14 in a case wherein a directional antenna having the radiation pattern illustrated in FIG. 16 is used as a right-directional antenna. FIG. 18 illustrates an example of a reception power value measured by the on-train monitoring apparatus 14 in a case wherein a directional antenna having the radiation pattern illustrated in FIG. 16 is used as a left-directional antenna.

It is possible to estimate an arrival direction of a disturbance wave by arranging two directional antennas toward the directions whereby a largest gain can be obtained (directions to make the gain become the largest in the radiation pattern) in right and left directions of the on-train monitoring apparatus 14, and comparing reception power values in the right and left directions.

In the example of the radiation pattern in FIG. 16, the gain is the largest in the direction of 0 degrees. That is, in the example of the radiation pattern in FIG. 16, a largest power is received from the direction of 0 degrees of the directional antenna. Therefore, when a directional antenna having the radiation pattern in FIG. 16 is used, the directional antenna is arranged so that the direction of 0 degrees of the directional antenna faces the right and left directions with respect to the traveling direction of the train.

Further, when the directional antenna is used, in comparison with a reception power value in a case of a non-directional antenna, local increase is exhibited in the reception power value of a radio wave from a direction where a larger gain can be obtained. Therefore, by using the directional antenna, it is possible to estimate the position of the generation source of the disturbance wave with a higher degree of accuracy.

Further, due to the feature of the directional antenna, it is possible to estimate a position of a farther generation source of a disturbance wave by using the directional antenna.

In Second Embodiment, detection by a similar method is also possible by using one array antenna instead of two directional antennas.

In the present embodiment, description will be made mainly on differences from First Embodiment.

The items not described below are similar to those in First Embodiment.

*Description of Configuration*

An example of a hardware configuration of the disturbance wave generation source estimation device 16 according to the present embodiment is the same as illustrated in FIG. 7.

Further, an example of a functional configuration of the disturbance wave generation source estimation device 16 according to the present embodiment is the same as illustrated in FIG. 8

FIG. 19 illustrates an example of the on-train measurement result data 152 according to the present embodiment.

As illustrated in FIG. 19, there exist an RSSI (right) and an RSSI (left) in the on-train measurement result data 152 according to the present embodiment.

The RSSI (right) indicates a reception power value of a radio wave received by the right-directional antenna, measured by the on-train monitoring apparatus 14. The RSSI (left) indicates a reception power value of a radio wave received by the left-directional antenna, measured by the on-train monitoring apparatus 14. Further, the RSSI (right) measured by the on-train monitoring apparatus 14 during the disturbance wave generation period is called a right-measurement reception power value. Further, the RSSI (left)

measured by the on-train monitoring apparatus 14 during the disturbance wave generation period is called a left-measurement reception power value.

Elements other than the RSSI (right) and the RSSI (left) are the same as those illustrated in (b) of FIG. 9.

Further, the ground measurement result data 151 is the same as illustrated in (a) of FIG. 9.

In the present embodiment, values in a case of using a directional antenna are indicated in the learning data 500. That is, in the learning data 500 according to the present embodiment, an approximating result of a quadratic expression in the case of using the directional antenna is indicated for each combination of a coefficient value corresponding to a visibility condition in the case of using the directional antenna, and a candidate distance in the case of using the directional antenna. The value of the learning data 500 according to the present embodiment is different from the value of the learning data 500 according to First Embodiment. However, the configuration of the learning data 500 according to the present embodiment itself is as illustrated in FIG. 10. Therefore, in what follows, description will be continued with the learning data 500 in FIG. 10 being taken as the learning data 500 according to the present embodiment.

*Description of Operation*

Figure 20:
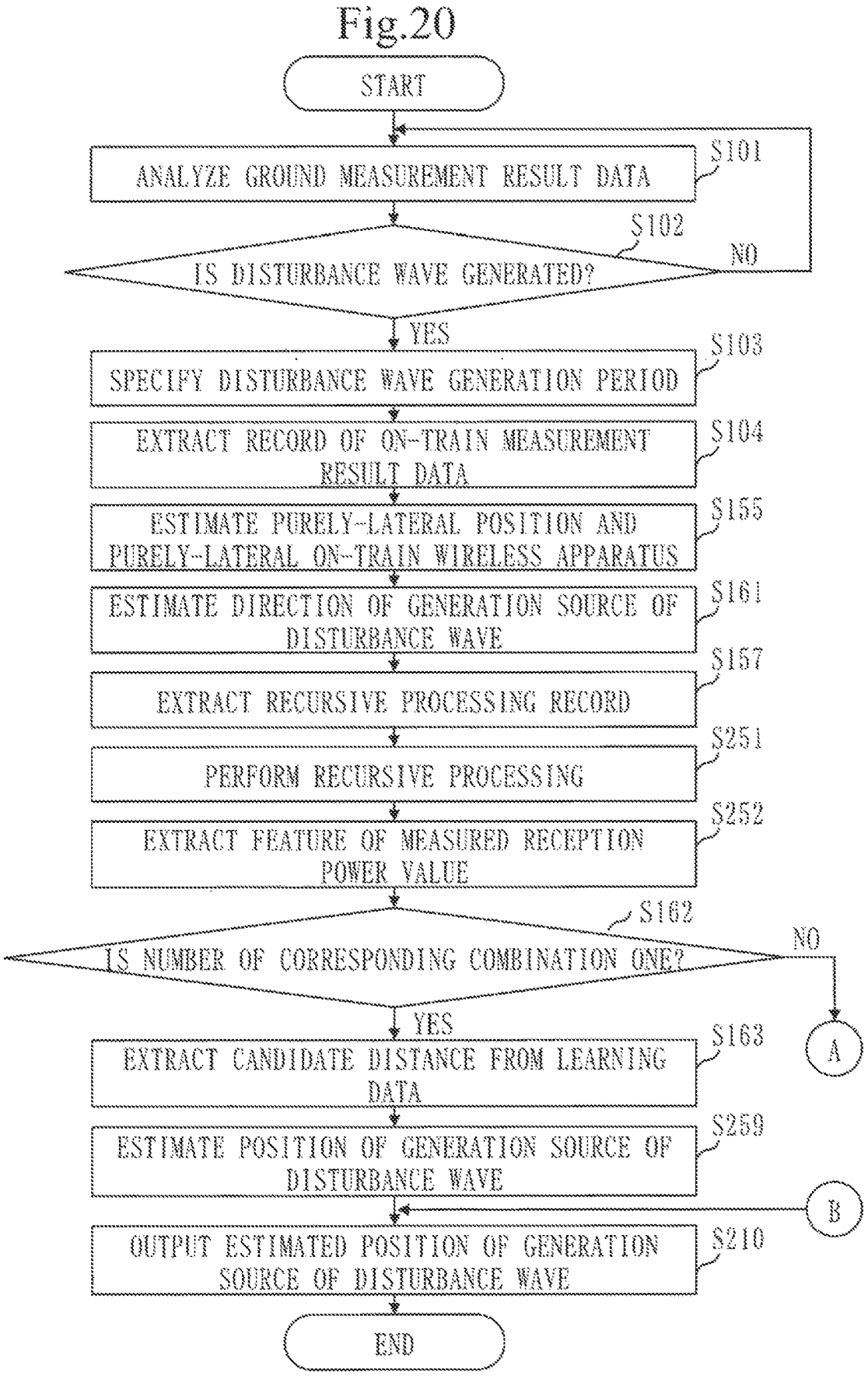
FIG. 20 is a flowchart illustrating an operation example of a disturbance wave generation source estimation device according to the second embodiment.

FIG. 20 and FIG. 21 illustrate operation examples of the disturbance wave generation source estimation device 16 according to the present embodiment.

Hereinafter, description will be made on the operation examples of the disturbance wave generation source estimation device 16 according to the present embodiment with reference to FIG. 20 and FIG. 21.

In FIG. 20 and FIG. 21, Step S15X corresponds to Step S10X illustrated in FIG. 11. Further, Step S25X corresponds to Step S20X in FIG. 13. Furthermore, Step S16X is processing added in FIG. 20 and FIG. 21.

The procedures of FIG. 20 and FIG. 21 shall be repeated at a fixed cycle.

Step S101 through Step S104 are the same as those illustrated in FIG. 11. Therefore, description of Step S101 through Step S104 is omitted.

In Step S155, the purely-lateral position estimation unit 1603 estimates a purely-lateral position and a purely-lateral-on-train wireless apparatus.

Specifically, the purely-lateral position estimation unit 1603 extracts a largest RSSI among the RSSI (right) being the right-measurement reception power value and the RSSI (left) being the left-measurement reception power value indicated in the record extracted by the disturbance wave detection unit 1602 in Step S104. Then, the purely-lateral position estimation unit 1603 extracts the record wherein the largest RSSI is indicated. The largest RSSI extracted in Step S155 is called "largest RSSI".

Then, the purely-lateral position estimation unit 1603 estimates as the purely-lateral position, a position specified by "X-coordinate" and "Y-coordinate" of the record extracted wherein the largest RSSI is indicated. The purely-lateral position estimated in Step S155 corresponds to the estimated purely-lateral position 203.

Further, the purely-lateral position estimation unit 1603 estimates as the purely-lateral-on-train wireless apparatus, the on-train wireless communication apparatus 11 specified by "on-train wireless apparatus number" of the record extracted wherein the largest RSSI is indicated.

Next, in Step S161, the purely-lateral position estimation unit 1603 estimates a direction of a generation source of a disturbance wave.

That is, when the RSSI (right) is extracted as the largest RSSI in Step S155, the purely-lateral position estimation unit 1603 estimates that the generation source of the disturbance wave exists in the right direction with respect to the traveling direction of the train from the estimated purely-lateral position 203. When the RSSI (left) is extracted as the largest RSSI in Step S155, the purely-lateral position estimation unit 1603 estimates that the generation source of the disturbance wave exists in the left direction with respect to the traveling direction of the train from the estimated purely-lateral position 203.

Next, in Step S157 the purely-lateral position estimation unit 1603 extracts a recursive processing record.

Specifically, the purely-lateral position estimation unit 1603 extracts as the recursive processing record, a record wherein the number of the purely-lateral-on-train wireless apparatus is indicated in "on-train wireless apparatus number" from among the records extracted by the disturbance wave detection unit 1602 in Step S104.

Further, the purely-lateral position estimation unit 1603 deletes an RSSI which does not correspond to the direction of the generation source of the disturbance wave from the recursive processing record extracted. For example, when the generation source of the disturbance wave is estimated to be in the right direction with respect to the traveling direction of the train in Step S161, the purely-lateral position estimation unit 1603 deletes the RSSI (left) from the recursive processing record.

The purely-lateral position estimation unit 1603 outputs the recursive processing record after the RSSI is deleted to the feature extraction unit 1604.

Next, in Step S251, the feature extraction unit 1604 performs recursive processing using the recursive processing record output from the purely-lateral position estimation unit 1603. The feature extraction unit 1604 performs recursive processing using the RSSI (right) and the RSSI (left).

Then, in Step S252, the feature extraction unit 1604 extracts the feature of the measured reception power value (RSSI) indicated in the recursive processing record.

That is, the feature extraction unit 1604 calculates a quadratic function approximating a curved shape of an area in the vicinity of the vertex illustrated in FIG. 4, by recursive processing.

Then, the feature extraction unit 1604 notifies the candidate distance extraction unit 1605 of the quadratic function calculated, as the feature of the measured reception power value (RSSI).

Next, the candidate distance extraction unit 1605 searches for a combination of a coefficient value and a candidate distance indicating an approximating result similar to the quadratic function notified from the feature extraction unit 1604.

Then, the candidate distance extraction unit 1605 determines whether there exists one combination of the coefficient value and the candidate distance indicating the approximating result similar to the quadratic function notified from the feature extraction unit 1604.

When there exists one relevant combination, the processing proceeds to Step S163. Meanwhile, when there exist two or more relevant combinations, the processing proceeds to Step S253 in FIG. 21.

In Step S163, the candidate distance extraction unit 1605 extracts a candidate distance of the record indicating the approximating result similar to the quadratic function notified from the feature extraction unit 1604.

Next, in Step S259, the generation source position estimation unit 1606 estimates the position of the generation source of the disturbance wave.

That is, the generation source position estimation unit 1606 estimates as the position of the generation source of the disturbance wave, a position away from the estimated purely-lateral position 203 by the candidate distance extracted in Step S253 in the direction estimated in Step S161.

Lastly, in Step S210, the output unit 1607 outputs the estimated position of the generation source of the disturbance wave obtained in Step S259 to the input and output device 905 (display), for example.

When it is determined to be "NO" in Step S162, the candidate distance extraction unit 1605 extracts coefficient values and candidate distances from the learning data 500 in Step S253 of FIG. 21.

Specifically, the candidate distance extraction unit 1605 extracts candidate distances and coefficient values of two or more records indicating approximating results similar to the quadratic function notified from the feature extraction unit 1604.

The candidate distance extraction unit 1605 notifies the generation source position estimation unit 1606 of the extracted coefficient values and the extracted candidate distances that have been extracted.

Next, in Step S106 the purely-lateral position estimation unit 1603 designates a verification position.

The purely-lateral position estimation unit 1603 refers to installation position data of the ground monitoring apparatus 13 not illustrated, for example, and designates as a verification position, the location position of the ground monitoring apparatus 13 closest to the estimated purely-lateral position 203. The verification position may be in a direction different from the direction estimated in Step S161. For example, when the generation source of the disturbance wave is estimated to be in the right direction with respect to the traveling direction of the train in Step S161, the purely-lateral position estimation unit 1603 may designate as the verification position, a position in the left direction of the estimated purely-lateral position 203.

Next, the generation source position estimation unit 1606 obtains radiation pattern data 600 in Step S164.

The radiation pattern data 600 is data obtained by digitizing the radiation pattern of the directional antenna illustrated in FIG. 16, and is data illustrated in FIG. 22, specifically.

The radiation pattern data 600 indicates a gain for each approaching angle of a radio wave, as illustrated in FIG. 22.

Next, in Step S254, the generation source position estimation unit 1606 estimates a transmission power value of the disturbance generation source.

Specifically, the generation source position estimation unit 1606 calculates a transmission power by "correction RSSI+attenuation amount".

"Correction RSSI" is a value obtained by subtracting a largest value of "gain (dBm)" indicated in the radiation pattern data 600 in FIG. 22 from the largest RSSI specified in Step S155. The generation source position estimation unit 1606 inquires "largest RSSI" of the purely-lateral position estimation unit 1603, and obtains "largest RSSI" from the purely-lateral position estimation unit 1603.

In a case wherein the directional antenna is used, it is necessary to consider the radiation pattern of the directional antenna when a transmission power value of the generation source of the disturbance wave is estimated. The reception power value from a direction of a high gain becomes higher than a reception power value in a case of using a non-directional antenna since the gain is high. Therefore, when the transmission power value of the generation source of the disturbance wave is estimated by using the reception power value (largest RSSI) in the case of using the directional antenna as it is, a value larger than an actual transmission power value at the generation source of the disturbance wave is calculated.

Therefore, the generation source position estimation unit 1606 obtains a correction RSSI being a correction value by subtracting a largest value of the gain of the radiation pattern from the largest RSSI, as described above. By performing calculation using the correction RSSI, it is possible to correctly estimate the transmission power value of the generation source of the disturbance wave.

Further, as with First Embodiment, the generation source position estimation unit 1606 calculates "attenuation amount" by "coefficient value×candidate distance". The coefficient value and the candidate distance are the coefficient value and the candidate distance notified from the candidate distance extraction unit 1605.

Step S205 through Step S209 are the same as illustrated in FIG. 13. Therefore, description of Step S205 through Step S209 is omitted.

Since the processing in FIG. 21 is performed when two sets of or more extracted coefficient values and extracted candidate distances are extracted, Step S254 through Step S206 are performed for each combination of the extracted coefficient value and the extracted candidate distance.

Then, in Step S208, a plurality of first verification-target reception power values or a plurality of second verification-target reception power values are compared with the verification reception power value.

Further, in Step S209, a verification-target reception power value having a smallest difference from the verification reception power value is selected. Then, a position away from the estimated purely-lateral position 203 by a distance corresponding to the verification-target reception power value selected in the direction estimated in Step S161 is estimated to be a position of the generation source of the disturbance wave.

*Description of Effect of Embodiment*

According to the present embodiment, by using the directional antenna, it is possible to estimate the position of the generation source of the disturbance wave earlier with higher accuracy.

Third Embodiment

*Outline of Embodiment*

Figure 23:
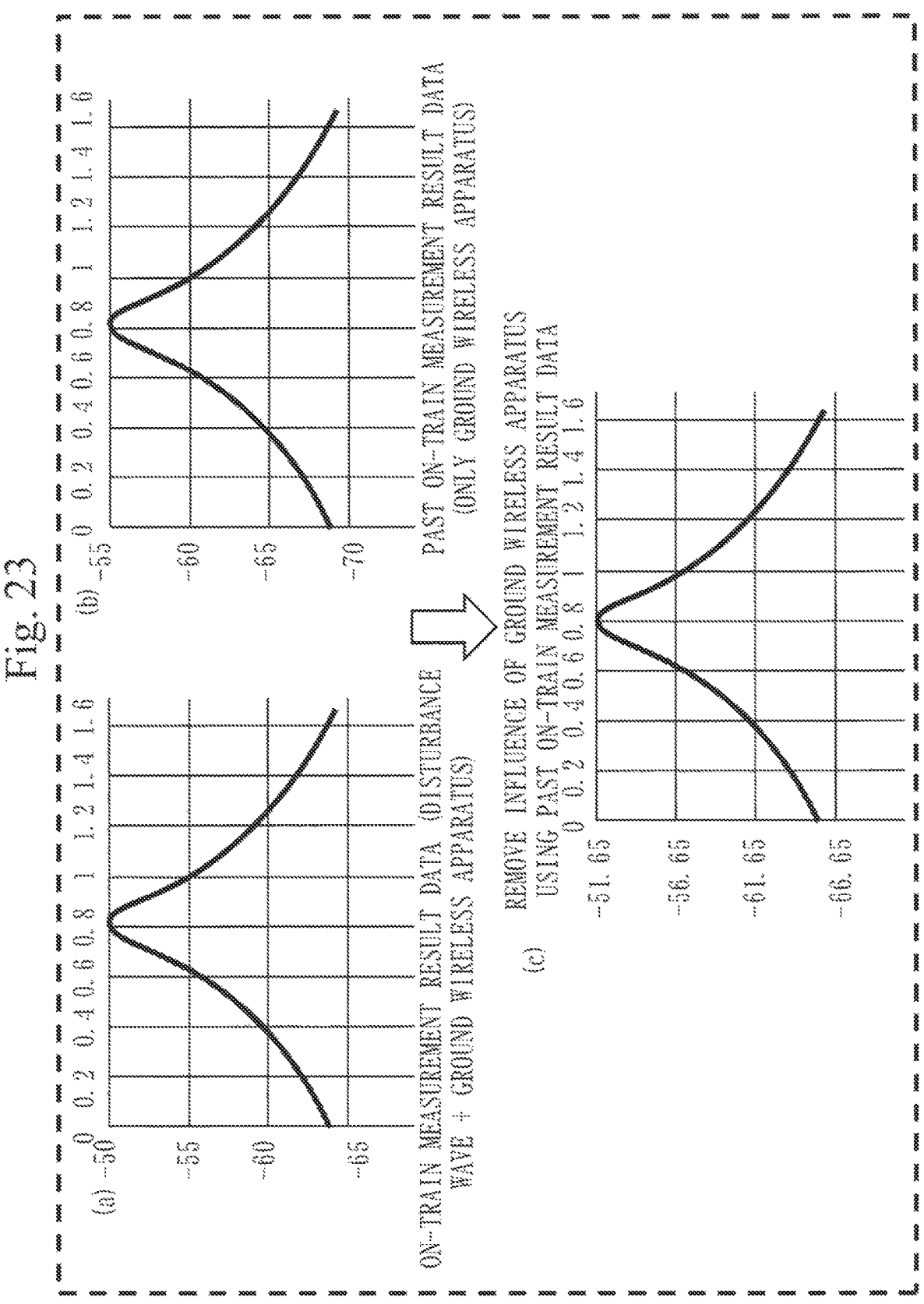
FIG. 23 is a diagram illustrating an outline of an operation according to a third embodiment.

FIG. 23 illustrates an outline of a present embodiment. In the present embodiment, description will be made on an example wherein a non-directional antenna is mounted on a train; however, the description below can be applied to a case wherein a directional antenna is mounted on a train as well.

In First Embodiment, description has been made on the assumption that a measured reception power value (RSSI) indicated in the on-train measurement result data 152 is not influenced by radio waves other than disturbance waves. However, in reality, there is a case wherein a measured reception power value (RSSI) indicated in the on-train measurement result data 152 includes influence of radio waves other than disturbance waves. Specifically, as illustrated in (a) in FIG. 23, there is a case wherein a measured reception power value (RSSI) indicated in the on-train measurement result data 152 includes influence of radio waves from the ground wireless communication apparatus 10.

In the present embodiment, the disturbance wave generation source estimation device 16 performs correction to remove, from the measured reception power value (RSSI) indicated in the on-train measurement result data 152, influences of electric waves from the ground wireless communication apparatus 10.

Specifically, the disturbance wave generation source estimation device 16 extracts an RSSI only of a radio wave of the ground wireless communication apparatus 10 from past on-train measurement result data, as illustrated in (b) of FIG. 23. Further, the disturbance wave generation source estimation device 16 performs correction to remove, from the measured reception power value (RSSI) indicated in the on-train measurement result data 152, influence of a radio wave from the ground wireless communication apparatus 10, using an RSSI only of a radio wave of the ground wireless communication apparatus 10 extracted. Then, the disturbance wave generation source estimation device 16 estimates the position of the generation source of the disturbance wave, using the measured reception power value (RSSI) after the influence of the radio wave from the ground wireless communication apparatus 10 is removed, as illustrated in (c) of FIG. 23.

In the present embodiment, description will be made mainly on differences from First Embodiment.

The items not described below are similar to those of First Embodiment.

\*\*\*Description of Configuration\*\*\*

An example of a hardware configuration of the disturbance wave generation source estimation device 16 according to the present embodiment is the same as illustrated in FIG. 7.

Figure 24:
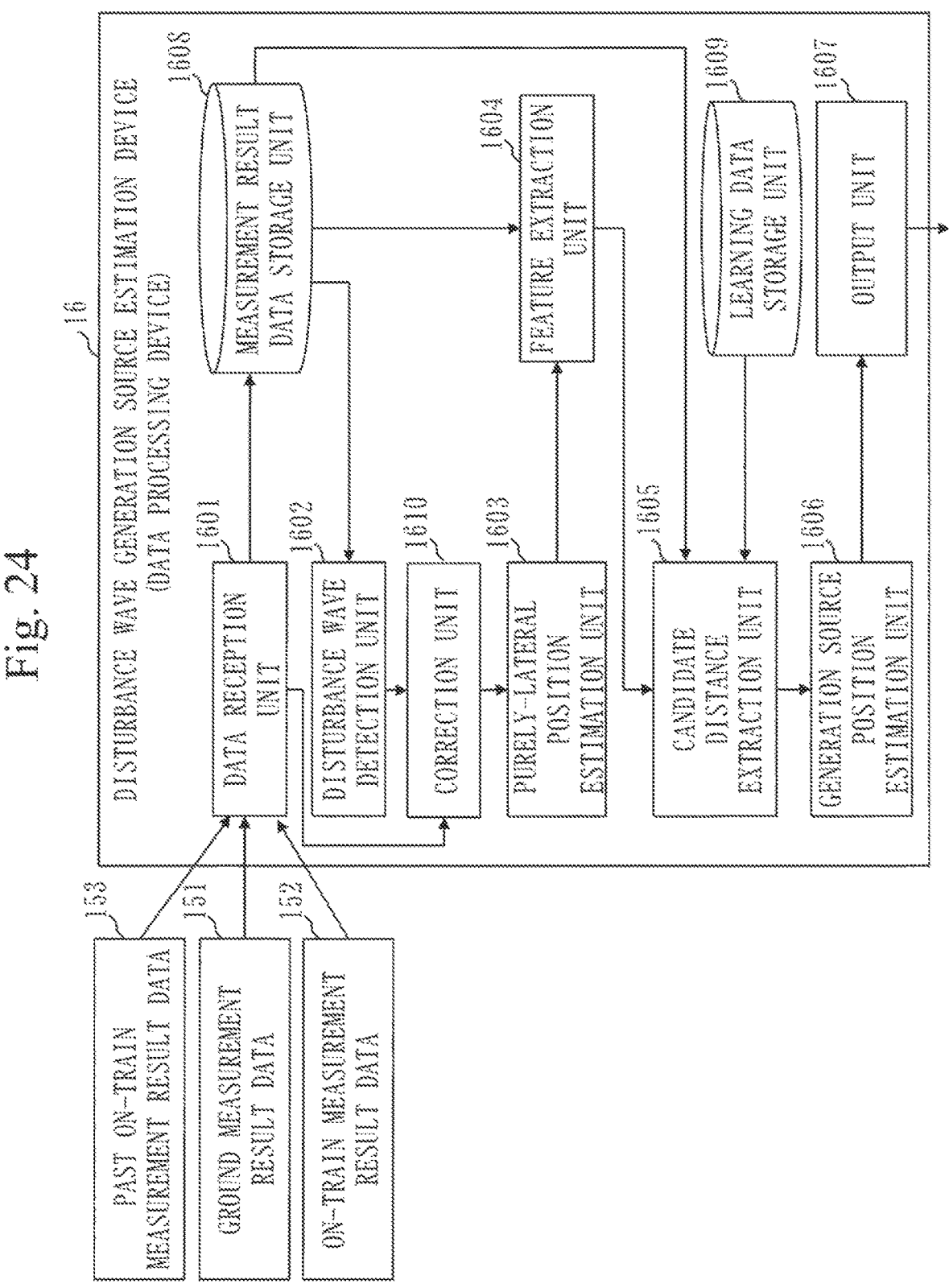
FIG. 24 is a flowchart illustrating an example of a functional configuration of a disturbance wave generation source estimation device according to the third embodiment.

FIG. 24 illustrates an example of a functional configuration of the disturbance wave generation source estimation device 16 according to the present embodiment.

In comparison to FIG. 8, a correction unit 1610 is added in FIG. 24.

Further, in FIG. 24, the data reception unit 1601 obtains past on-train measurement result data 153. The past on-train measurement result data 153 is on-train measurement result data generated by the on-train monitoring apparatus 14 in the past, and collected by the data collection device 15. The past on-train measurement result data 153 indicates a reception power value measured by the on-train monitoring apparatus 14 when a disturbance wave is not generated. That is, the past on-train measurement result data 153 indicates only an RSSI of a radio wave from the ground wireless communication apparatus 10. Since the data configuration of the past on-train measurement result data 153 is the same as the data configuration of the ground measurement result data 151, a concrete example of the past on-train measurement result data 153 is not illustrated.

The correction unit 1610 performs correction to remove influence of a radio wave from the ground wireless communication apparatus 10, from the RSSI indicated in the ground measurement result data 151, using the past on-train measurement result data 153.

In the present embodiment, the purely-lateral position estimation unit 1603 estimates an estimated purely-lateral position 203, using the RSSI after correction by the correction unit 1610.

Further, the feature extraction unit 1604 extracts a feature of a measured reception power value, using the RSSI after correction by the correction unit 1610.

\*\*\*Description of Operation\*\*\*

Figure 25:
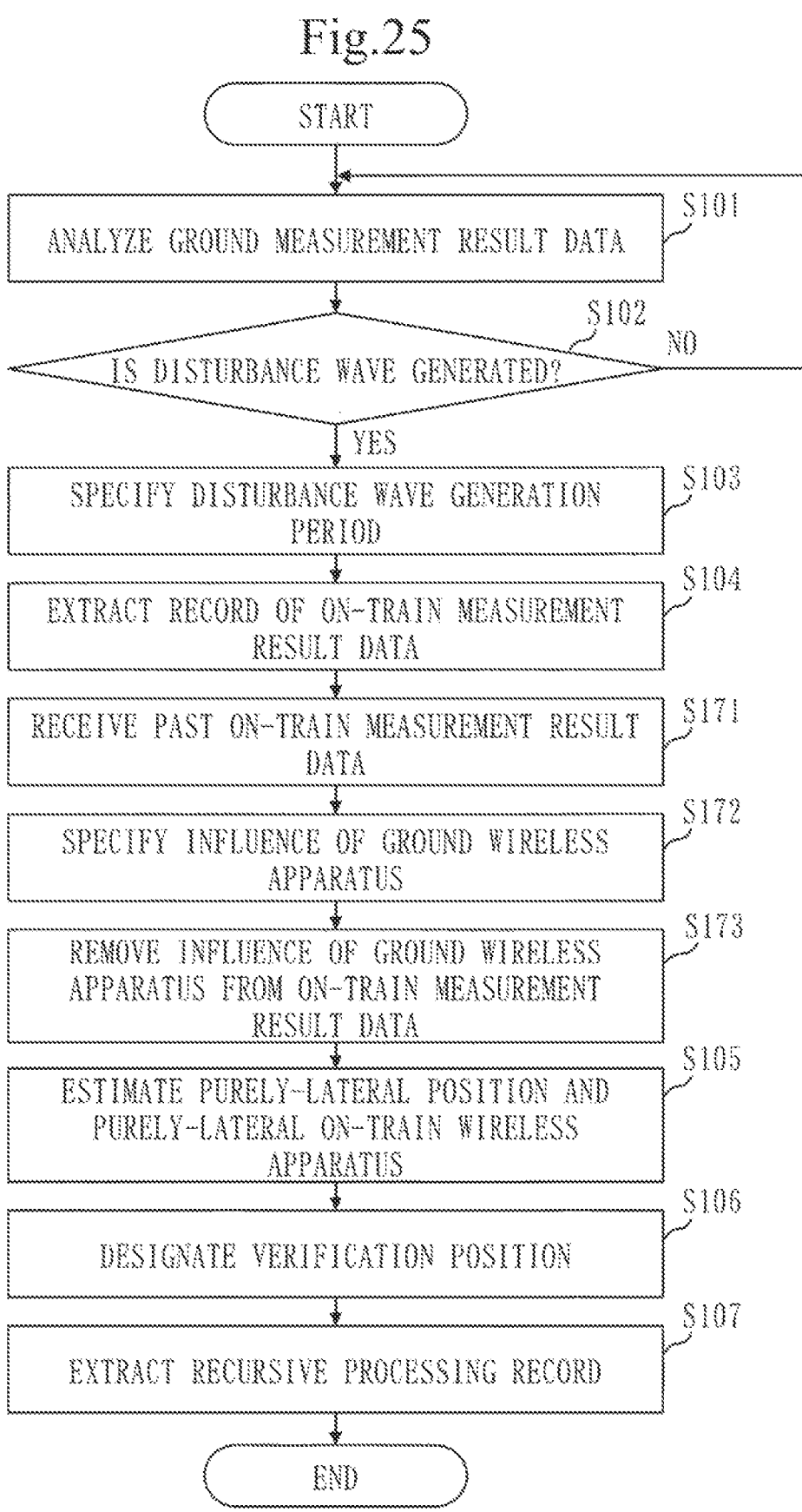
FIG. 25 is a flowchart illustrating an operation example of the disturbance wave generation source estimation device according to the third embodiment.

FIG. 25 illustrates an operation example of the disturbance wave generation source estimation device 16 according to the present embodiment. FIG. 25 corresponds to FIG. 11 described in First Embodiment.

Hereinafter, description will be made on an operation example of the disturbance wave generation source estimation device 16 according to the present embodiment with reference to FIG. 25.

The procedure of FIG. 25 shall be repeated at a fixed cycle.

Step S101 through Step S104 are the same as illustrated in FIG. 11. Therefore, description of Step S101 through Step S104 is omitted.

In the present embodiment, the disturbance wave detection unit 1602 outputs a record of the on-train measurement result data 152 extracted in Step S104 to the correction unit 1610.

In Step S171, the data reception unit 1601 receives the past on-train measurement result data 153 from the data collection device 15.

The data reception unit 1601 outputs the past on-train measurement result data 153 received to the correction unit 1610.

Next, in Step S172 the correction unit 1610 specifies influence of a radio wave from the ground wireless communication apparatus 10.

Specifically, the correction unit 1610 extracts a record whereof "clock time" matches that of the on-train measurement result data 152 obtained from the disturbance wave detection unit 1602, from the past on-train measurement result data 153. Then, the correction unit 1610 extracts an RSSI indicated in the record extracted from the past on-train measurement result data 153, as the RSSI of the radio wave from the ground wireless communication apparatus 10.

For example, the correction unit 1610 may handle the RSSI indicated in the record extracted from the past on-train measurement result data 153 as it is, as influence of the radio wave from the ground wireless communication apparatus 10, or may handle a value after being performed statistic processing, as influence of the radio wave from the ground wireless communication apparatus 10.

Description will be made on an example wherein the correction unit 1610 handles RSSIs indicated in the records extracted from the past on-train measurement result data 153 as they are, as influence of the radio wave from the ground wireless communication apparatus 10.

For example, it is supposed that "clock time" indicated in records of the on-train measurement result data 152 obtained from the disturbance wave detection unit 1602 is "t1" through "t5". In this case, the correction unit 1610 obtains one piece of past on-train measurement result data 153 from the data reception unit 1601. Then, the correction unit 1610 extracts a record wherein "t1" through "t5" are indicated in the column of "clock time" from the past on-train measurement result data 153 obtained. The correction unit 1610 can handle the RSSI of the record of "t1" through "t5" extracted as it is, as influence of the radio wave from the ground wireless communication apparatus.

Next, description will be made on an example wherein the correction unit 1610 handles a value after being performed statistic processing, as influence of the radio wave from the ground wireless communication apparatus 10. Also in this case, it is supposed that "clock time" indicated in the record of the on-train measurement result data 152 obtained from the disturbance wave detection unit 1602 is "t1" through "t5".

The correction unit 1610 obtains a plurality of pieces of past on-train measurement result data 153 collected at a plurality of different timings. Then, the correction unit 1610 extracts a record wherein "t1" through "t5" are indicated in the column of "clock time" from each piece of the plurality of pieces of past on-train measurement result data 153 obtained. The correction unit 1610 can handle a statistic value obtained by performing statistic processing of the RSSIs of the plurality of records extracted, as influence of the radio wave from the ground wireless communication apparatus 10. The statistic value is any of a mean value, a median value, a largest value and a smallest value.

Next, in Step S173, the correction unit 1610 performs correction to remove the influence of the radio wave from the ground wireless communication apparatus 10 specified in Step S172, from the on-train measurement result data 152 obtained from the disturbance wave detection unit 1602.

Specifically, the correction unit 1610 subtracts an RSSI (or statistic value) of the radio wave from the ground wireless communication apparatus 10 specified in Step S172, from the RSSI of each record, for each "clock time" of the on-train measurement result data 152.

Then, the correction unit 1610 outputs the on-train measurement result data 152 after correction to the purely-lateral position estimation unit 1603.

Step S105 through Step S107 are as illustrated in FIG. 11.

In Step S105 the purely-lateral position estimation unit 1603 estimates the estimated purely-lateral position 203 and the purely-lateral-on-train wireless apparatus. In the present embodiment, the purely-lateral position estimation unit 1603 estimates the estimated purely-lateral position 203 and the purely-lateral-on-train wireless apparatus, using the on-train measurement result data 152 after correction. That is, in the present embodiment, the purely-lateral position estimation unit 1603 estimates a traveling position of the train at the point of time when a largest RSSI is measured among a plurality of RSSIs after being corrected by the correction unit 1610, as the estimated purely-lateral position 203.

Further, in Step S107, the purely-lateral position estimation unit 1603 extracts a recursive processing record. In the present embodiment, the purely-lateral position estimation unit 1603 extracts as the recursive processing record, a record whereof the number of the purely-lateral-on-train wireless apparatus is indicated in "on-train wireless apparatus number" from among the records of the on-train measurement result data 152 after correction.

Further, the operation of FIG. 13 is performed also in the present embodiment.

That is, Step S201 through Step S210 of FIG. 13 are performed as with First Embodiment.

In Step S202, the feature extraction unit 1604 extracts a feature of the measured reception power value (RSSI) indicated in the recursive processing record. As described above, in the present embodiment, the recursive processing record is a record whereof the number of the purely-lateral-on-train wireless apparatus is indicated in "on-train wireless apparatus number" among the records of the on-train measurement result data 152 after correction. Therefore, in the present embodiment, the feature extraction unit 1604 extracts the feature of the measured reception power value after being performed correction by the feature extraction unit 1604.

*Description of Effect of Embodiment*

According to the present embodiment, by removing the influence of a radio wave other than a disturbance wave, it is possible to estimate a position of a generation source of the disturbance wave earlier with higher accuracy.

Description has been made on First Embodiment trough Third Embodiment above; however, two or more among these embodiments can be combined and performed.

Otherwise, one of these embodiments may be partially performed.

Meanwhile, two or more of these embodiments may be partially combined and performed.

Further, the configurations and procedures described in these embodiments may be changed as needed.

*Supplementary Explanation of Hardware Configuration*

Lastly, supplementary explanation will be provided on a hardware configuration of the disturbance wave generation source estimation device 16.

The processor 901 illustrated in FIG. 7 is an IC (Integrated Circuit) to perform processing.

The processor 901 is a CPU (Central Processing Unit) and a DSP (Digital Signal Processor), etc.

The main storage device 902 illustrated in FIG. 7 is a RAM (Random Access Memory).

The auxiliary storage device 903 as illustrated in FIG. 7 is a ROM (Read Only Memory), a flash memory and an HDD (Hard Disk Drive), etc.

The communication device 904 as illustrated in FIG. 7 is an electronic circuit to perform data communication processing.

The communication device 904 is a communication chip or an NIC (Network Interface Card), for example.

Additionally, the auxiliary storage device 903 stores an OS (Operating System) as well.

Further, at least a part of the OS is executed by the processor 901.

The processor 901 executes programs to realize functions of the data reception unit 1601, the disturbance wave detection unit 1602, the purely-lateral position estimation unit 1603, the feature extraction unit 1604, the candidate distance extraction unit 1605, the generation source position estimation unit 1606, the output unit 1607 and the correction unit 1610 while executing at least a part of the OS.

By executing the OS by the processor 901, task management, memory management, file management and communication control, etc. are performed.

Further, at least any of information, data, signal values and variable values indicating results of the processing by the data reception unit 1601, the disturbance wave detection unit 1602, the purely-lateral position estimation unit 1603, the feature extraction unit 1604, the candidate distance extraction unit 1605, the generation source position estimation unit 1606, the output unit 1607 and the correction unit 1610 is stored in any of a main storage device 902, an auxiliary storage device 903, and a register and a cache memory inside the processor 901.

Furthermore, the programs to realize the functions of the data reception unit 1601, the disturbance wave detection unit 1602, the purely-lateral position estimation unit 1603, the feature extraction unit 1604, the candidate distance extraction unit 1605, the generation source position estimation unit 1606, the output unit 1607 and the correction unit 1610 may be stored in a portable recording medium such as a magnetic disk, a flexible disk, an optical disk, a compact disk, a Blue-ray (registered trademark) disk and a DVD, etc. Then, a portable recording medium storing the programs to realize the functions of the data reception unit 1601, the disturbance wave detection unit 1602, the purely-lateral position estimation unit 1603, the feature extraction unit 1604, the candidate distance extraction unit 1605, the generation source position estimation unit 1606, the output unit 1607 and the correction unit 1610 may be distributed.

Further, "unit" of the data reception unit 1601, the disturbance wave detection unit 1602, the purely-lateral position estimation unit 1603, the feature extraction unit 1604, the candidate distance extraction unit 1605, the generation source position estimation unit 1606, the output unit 1607 and the correction unit 1610 may be replaced with "circuit", "step", "procedure", "processing" or "circuitry".

Furthermore, the disturbance wave generation source estimation device 16 may be realized by a processing circuit. The processing circuit is, for example, a logic IC (Integrated Circuit), a GA (Gate Array), an ASIC (Application Specific Integrated Circuit) and an FPGA (Field-Programmable Gate Array).

In this case, each of the data reception unit 1601, the disturbance wave detection unit 1602, the purely-lateral position estimation unit 1603, the feature extraction unit 1604, the candidate distance extraction unit 1605, the generation source position estimation unit 1606, the output unit 1607 and the correction unit 1610 is realized as a part of the processing circuit.

In this specification, a superordinate concept of a processor and a processing circuit is called "processing circuitry".

That is, each of the processor and the processing circuit is a concrete example of "processing circuitry".

REFERENCE SIGNS LIST

10: ground wireless communication apparatus; 11: on-train wireless communication apparatus; 12: public network base station; 13: ground monitoring apparatus; 14: on-train monitoring apparatus; 15: data collection device; 16: disturbance wave generation source estimation device; 20: traveling track; 30: public network; 100: train control system; 151: ground measurement result data; 152: on-train measurement result data; 153: past on-train measurement result data; 201: disturbance wave generation period start position; 202: disturbance wave generation period finish position; 203: estimated purely-lateral position; 251: candidate position; 252: candidate position; 253: candidate position; 261: candidate position; 262: candidate position; 263: candidate position; 500: learning data; 600: radiation pattern data; 901: processor; 902: main storage device; 903: auxiliary storage device; 904: communication device; 905: input and output device; 1601: data reception unit; 1602: disturbance wave detection unit; 1603: purely-lateral position estimation unit; 1604: feature extraction unit; 1605: candidate distance extraction unit; 1606: generation source position estimation unit; 1607: output unit; 1608: measurement result data storage unit; 1609: learning data storage unit; 1610: correction unit

The invention claimed is:

1. A data processing device comprising:
processing circuitry
to estimate as an estimated purely-lateral position, when generation of a disturbance wave to disturb communication performed in a train is detected while the train is traveling, a position on a traveling track of the train, existing in a purely-lateral direction of a position of a generation source of the disturbance wave;
to extract a feature of a measured reception power value which is a reception power value measured in the train during a disturbance wave generation period being a period wherein the disturbance wave has been generated;

to extract, from learning data indicating a plurality of candidate distances being candidates of a distance between the position of the generation source of the disturbance wave and the estimated purely-lateral position, and indicating for each candidate distance, a feature of an estimated reception power value being a reception power value estimated to be measured in the train when the distance between the position of the generation source of the disturbance wave and the estimated purely-lateral position is the candidate distance, a candidate distance for which the feature of the estimated reception power value matches the feature of the measured reception power value, as an extracted candidate distance; and
to estimate a position being distant from the estimated purely-lateral position by the extracted candidate distance, as the position of the generation source of the disturbance wave, wherein
the processing circuitry
designates as a verification position, a position on an outside of the traveling track, where a reception power value has been measured during the disturbance wave generation period,
estimates as an estimated transmission power value, a transmission power value of the disturbance wave,
calculates as a first verification-target reception power value, a reception power value of the disturbance wave estimated to be measured at the verification position when a first position being a position distant from the estimated purely-lateral position by the extracted candidate distance in a right direction with respect to a traveling direction of the train is the position of the generation source of the disturbance wave, using the estimated transmission power value and a distance between the first position and the verification position,
calculates as a second verification-target reception power value, a reception power value of the disturbance wave estimated to be measured at the verification position when a second position being a position distant from the estimated purely-lateral position by the extracted candidate distance in a left direction with respect to the traveling direction of the train is the position of the generation source of the disturbance wave, using the estimated transmission power value and a distance between the second position and the verification position, and
compares each of the first verification-target reception power value and the second verification-target reception power value, with a verification reception power value being the reception power value measured at the verification position during the disturbance wave generation period, and estimates either the first position or the second position, as the position of the generation source of the disturbance wave, based on a comparison result.

2. The data processing device as defined in claim 1, wherein
the processing circuitry
calculates as a first attenuation amount, a power attenuation amount of the disturbance wave at the verification position when the first position is the position of the generation source of the disturbance wave, using the distance between the first position and the verification position,
calculates as a second attenuation amount, a power attenuation amount of the disturbance wave at the verification position when the second position is the position of the generation source of the disturbance wave, using the distance between the second position and the verification position, subtracts the first attenuation amount from the estimated transmission power value to calculate the first verification-target reception power value, and subtracts the second attenuation amount from the estimated transmission power value to calculate the second verification-target reception power value.

3. The data processing device as defined in claim 2, wherein the processing circuitry extracts as an extracted candidate distance and an extracted coefficient value, from learning data indicating combinations of the plurality of candidate distances and a plurality of coefficient values corresponding to a plurality of visibility conditions each being a condition related to visibility for a radio wave, and indicating for each of the combinations, a feature of an estimated reception power value being a reception power value estimated to be measured in the train when the distance between the position of the generation source of the disturbance wave and the estimated purely-lateral position is a candidate distance included in a combination and when a visibility condition at the position of the generation source of the disturbance wave is a visibility condition corresponding to a coefficient value included in the combination, a candidate distance and a coefficient value included in a combination for which the feature of the estimated reception power value matches the feature of the measured reception power value, multiplies the extracted coefficient value by the distance between the verification position and the first position to calculate the first attenuation amount, and multiplies the extracted coefficient value by the distance between the verification position and the second position to calculate the second attenuation amount.

4. The data processing device as defined in claim 1, wherein the processing circuitry designates as the verification position, an installation position of a ground monitoring apparatus closest to the estimated purely-lateral position among a plurality of ground monitoring apparatuses which are installed at a plurality of positions on the outside of the traveling track, each measuring a reception power value.

5. The data processing device as defined in claim 1, wherein the processing circuitry estimates as the estimated purely-lateral position, a traveling position of the train at a time when a largest reception power value is measured among a plurality of reception power values measured as the measured reception power values.

6. The data processing device as defined in claim 5, wherein the processing circuitry performs correction to remove an influence of a radio wave other than the disturbance wave from the plurality of reception power values, when the influence of the radio wave other than the disturbance wave exists in the plurality of reception power values, and estimates as the estimated purely-lateral position, a traveling position of the train at a time when a largest reception power value is measured among the plurality of reception power values after being performed correction.

7. The data processing device as defined in claim 1, wherein the processing circuitry selects from a plurality of trains, each of which travels on a different traveling track and measures the reception power value during traveling, a train wherein a largest reception power value has been measured during the disturbance wave generation period, and estimates the estimated purely-lateral position on a traveling track of the train selected.

8. The data processing device as defined in claim 7, wherein the processing circuitry analyzes reception power values of a plurality of ground wireless communication apparatuses which perform communication with the plurality of trains, and when an abnormality occurs in a reception power value of any of the plurality of ground wireless communication apparatuses, detects generation of the disturbance wave, and to determine as the disturbance wave generation period, a period during which the abnormality occurs, extracts from among the plurality of trains, a train which communicates during the disturbance wave generation period with the ground wireless communication apparatus wherein the abnormality occurs, and selects from among the train extracted, a train wherein the largest reception power value is measured during the disturbance wave generation period.

9. The data processing device as defined in claim 1, wherein in the train, a directional antenna is installed, and the processing circuitry estimates the estimated transmission power value, using a correction value obtained by subtracting a largest value of a gain of the directional antenna from a largest reception power value among a plurality of reception power values measured as measured reception power values.

10. The data processing device as defined in claim 1, wherein the processing circuitry performs correction to remove an influence of a radio wave other than the disturbance wave from the measured reception power value, when the influence of the radio wave other than the disturbance wave exists in the measured reception power value, and extracts the feature of the measured reception power value after being performed correction.

11. A data processing device comprising:

processing circuitry to estimate as an estimated purely-lateral position, when generation of a disturbance wave to disturb communication performed in a train is detected while the train is traveling, a position on a traveling track of the train, existing in a purely-lateral direction of a position of a generation source of the disturbance wave;

to extract a feature of a measured reception power value which is a reception power value measured in the train during a disturbance wave generation period being a period wherein the disturbance wave has been generated;

to extract, from learning data indicating a plurality of candidate distances being candidates of a distance between the position of the generation source of the disturbance wave and the estimated purely-latera position, and indicating for each candidate distance, a feature of an estimated reception power value being a reception power value estimated to be measured in the train when the distance between the position of the generation source of the disturbance wave and the estimated purely-lateral position is the candidate distance, a candidate distance for which the feature of the estimated reception power value matches the feature of the measured reception power value, as an extracted candidate distance; and to estimate a position being distant from the estimated purely-lateral position by the extracted candidate distance, as the position of the generation source of the disturbance wave, wherein in the train, a right-directional antenna whose directivity direction is right direction with respect to a traveling direction of the train, to receive a radio wave from the right direction with respect to the traveling direction of the train, and a left-directional antenna whose directivity direction is left direction with respect to the traveling direction of the train, to receive a radio wave from the left direction with respect to the traveling direction of the train, are installed, wherein the processing circuitry estimates as the estimated purely-lateral position, a traveling position of the train at a time when a largest reception power value is measured among a right-measurement reception power value being a reception power value of the radio wave received by the right-directional antenna during the disturbance wave generation period, and a left-measurement reception power value being a reception power value of the radio wave received by the left-directional antenna during the disturbance wave generation period, and estimates, when the largest reception power value is the right-measurement reception power value, that the position of the generation source of the disturbance wave is in the right direction with respect to the traveling direction of the train, and when the largest reception power value is the left-measurement reception power value, that the position of the generation source of the disturbance wave is in the left direction with respect to the traveling direction of the train, extracts, when the position of the generation source of the disturbance wave is estimated to be in the right direction with respect to the traveling direction of the train, a feature of the right-measurement reception power value, extracts, when the position of the generation source of the disturbance wave is estimated to be in the left direction with respect to the traveling direction of the train, a feature of the left-measurement reception power value, extracts as the extracted candidate distance, when the feature of the right-measurement reception power value is extracted, a candidate distance for which the feature of the estimated reception power value matches the feature of the right-measurement reception power value, from the learning data, extracts as the extracted candidate distance, when the feature of the left-measurement reception power value is extracted, a candidate distance for which the feature of the estimated reception power value matches the feature of the left-measurement reception power value, from the learning data, estimates as the position of the generation source of the disturbance wave, when the position of the generation source of the disturbance wave is estimated to be in the right direction with respect to the traveling direction of the train, a position being distant from the estimated purely-lateral position by the extracted candidate distance in the right direction with respect to the traveling direction of the train, and estimates as the position of the generation source of the disturbance wave, when the position of the generation source of the disturbance wave is estimated to be in the left direction with respect to the traveling direction of the train, a position being distant from the estimated purely-lateral position by the extracted candidate distance in the left direction with respect to the traveling direction of the train.

12. A data processing method comprising:

by a computer, a purely-lateral position estimation process to estimate as an estimated purely-lateral position, when generation of a disturbance wave to disturb communication performed in a train is detected while the train is traveling, a position on a traveling track of the train, existing in a purely-lateral direction of a position of a generation source of the disturbance wave;

by the computer, a feature extraction process to extract a feature of a measured reception power value which is a reception power value measured in the train during a disturbance wave generation period being a period wherein the disturbance wave has been generated;

by the computer, a candidate distance extraction process to extract, from learning data indicating a plurality of candidate distances being candidates of a distance between the position of the generation source of the disturbance wave and the estimated purely-lateral position, and indicating for each candidate distance, a feature of an estimated reception power value being a reception power value estimated to be measured in the train when the distance between the position of the generation source of the disturbance wave and the estimated purely-lateral position is the candidate distance, a candidate distance for which the feature of the estimated reception power value matches the feature of the measured reception power value, as an extracted candidate distance; and by the computer, a generation source position estimation process to estimate a position being distant from the estimated purely-lateral position by the extracted candidate distance, as the position of the generation source of the disturbance wave, wherein in the generation source position estimation process, the computer designates as a verification position, a position on an outside of the traveling track, where a reception power value has been measured during the disturbance wave generation period, estimates as an estimated transmission power value, a transmission power value of the disturbance wave, calculates as a first verification-target reception power value, a reception power value of the disturbance wave estimated to be measured at the verification position when a first position being a position distant from the estimated purely-lateral position by the extracted candidate distance in a right direction with respect to a traveling direction of the train is the position of the generation source of the disturbance wave, using the estimated transmission power value and a distance between the first position and the verification position, calculates as a second verification-target reception power value, a reception power value of the disturbance wave estimated to be measured at the verification position when a second position being a position distant from the estimated purely-lateral position by the extracted candidate distance in a left direction with respect to the traveling direction of the train is the position of the generation source of the disturbance wave, using the estimated transmission power value and a distance between the second position and the verification position, and compares each of the first verification-target reception power value and the second verification-target reception power value, with a verification reception power value being the reception power value measured at the verification position during the disturbance wave generation period, and estimates either the first position or the second position, as the position of the generation source of the disturbance wave, based on a comparison result.

13. A non-transitory computer readable medium storing a data processing program which causes a computer to execute:

a purely-lateral position estimation process to estimate as an estimated purely-lateral position, when generation of a disturbance wave to disturb communication performed in a train is detected while the train is traveling, a position on a traveling track of the train, existing in a purely-lateral direction of a position of a generation source of the disturbance wave;

a feature extraction process to extract a feature of a measured reception power value which is a reception power value measured in the train during a disturbance wave generation period being a period wherein the disturbance wave has been generated;

a candidate distance extraction process to extract, from learning data indicating a plurality of candidate distances being candidates of a distance between the position of the generation source of the disturbance wave and the estimated purely-lateral position, and indicating for each candidate distance, a feature of an estimated reception power value being a reception power value estimated to be measured in the train when the distance between the position of the generation source of the disturbance wave and the estimated purely-lateral position is the candidate distance, a candidate distance for which the feature of the estimated reception power value matches the feature of the measured reception power value, as an extracted candidate distance; and a generation source position estimation process to estimate a position being distant from the estimated purely-lateral position by the extracted candidate distance, as the position of the generation source of the disturbance wave, wherein in the generation source position estimation process, the computer is caused to designate as a verification position, a position on an outside of the traveling track, where a reception power value has been measured during the disturbance wave generation period, estimate as an estimated transmission power value, a transmission power value of the disturbance wave, calculate as a first verification-target reception power value, a reception power value of the disturbance wave estimated to be measured at the verification position when a first position being a position distant from the estimated purely-lateral position by the extracted candidate distance in a right direction with respect to a traveling direction of the train is the position of the generation source of the disturbance wave, using the estimated transmission power value and a distance between the first position and the verification position, calculate as a second verification-target reception power value, a reception power value of the disturbance wave estimated to be measured at the verification position when a second position being a position distant from the estimated purely-lateral position by the extracted candidate distance in a left direction with respect to the traveling direction of the train is the position of the generation source of the disturbance wave, using the estimated transmission power value and a distance between the second position and the verification position, and compare each of the first verification-target reception power value and the second verification-target reception power value, with a verification reception power value being the reception power value measured at the verification position during the disturbance wave generation period, and estimate either the first position or the second position, as the position of the generation source of the disturbance wave, based on a comparison result.

* * * * *